US010937057B2

(12) United States Patent
Laufenberg et al.

(10) Patent No.: US 10,937,057 B2
(45) Date of Patent: Mar. 2, 2021

(54) INTERACTIVE DATA-DRIVEN GRAPHICAL USER INTERFACE FOR CROSS-CHANNEL WEB SITE PERFORMANCE

(71) Applicant: Rise Interactive Media & Analytics, LLC, Chicago, IL (US)

(72) Inventors: Brent Laufenberg, Chicago, IL (US); Justin Dougherty, Chicago, IL (US); Andrea McLeod, Chicago, IL (US); Michael Thone, Chicago, IL (US); Justin Garvin, Chicago, IL (US); Lawrence Fisher, Chicago, IL (US); Jonathon Morris, Chicago, IL (US)

(73) Assignee: Rise Interactive Media & Analytics, LLC, Chicago, IL (US)

(*) Notice: Subject to any disclaimer, the term of this patent is extended or adjusted under 35 U.S.C. 154(b) by 499 days.

(21) Appl. No.: 15/783,440

(22) Filed: Oct. 13, 2017

(65) Prior Publication Data
US 2018/0108036 A1    Apr. 19, 2018

Related U.S. Application Data

(60) Provisional application No. 62/407,840, filed on Oct. 13, 2016, provisional application No. 62/430,134, filed on Dec. 5, 2016.

(51) Int. Cl.
*G06Q 30/02* (2012.01)
*G06T 11/20* (2006.01)
(Continued)

(52) U.S. Cl.
CPC ..... *G06Q 30/0256* (2013.01); *G06Q 30/0246* (2013.01); *G06F 3/0482* (2013.01); *G06F 16/9558* (2019.01); *G06T 11/206* (2013.01)

(58) Field of Classification Search
CPC ...................................................... G06Q 30/02
See application file for complete search history.

(56) References Cited

U.S. PATENT DOCUMENTS 7,146,416 B1    12/2006  Yoo et al.
7,668,950 B2     2/2010  Horowitz et al.
(Continued)

FOREIGN PATENT DOCUMENTS

EP         2 884 441 A1    6/2015
WO    WO-2008106687 A2 *  9/2008  ....... G06Q 10/06395
WO       2015/050503 A1    4/2015

OTHER PUBLICATIONS

Weider D. Yu; Andy Lin, The Design and Implementation of a Search Engine Marketing Management System (SEMMS) Based on Service-Oriented Architecture Platform (English), IEEE Inrenational Conference on e-Business Engineering (ICEBE'07)(pp. 513-519), Oct. 1, 2007 (Year: 2007).*

(Continued)

*Primary Examiner* — Marilyn G Macasiano
(74) *Attorney, Agent, or Firm* — McDonnell Boehnen Hulbert & Berghoff LLP

(57) ABSTRACT

An embodiment may involve receiving, from one or more server devices, representations of past amounts spent on paid search engine listings for a web site and representations of paid search conversions involving the web site that are attributable to the paid search engine listings. The embodiment may also involve receiving representations of past amounts spent on the display promotions for the web site and representations of display conversions involving the web site. The embodiment may also involve receiving a request for a graphical representation of the cross-channel performance of the web site with respect to conversions. In response to receiving the request for the graphical representation of the cross-channel performance of the web site, the (Continued)

computing system may transmit the graphical representation of the cross-channel performance of the web site.

20 Claims, 17 Drawing Sheets

(51) Int. Cl.
  *G06F 3/0482* (2013.01)
  *G06F 16/955* (2019.01)

(56) References Cited

U.S. PATENT DOCUMENTS

| | | | |
|---|---|---|---|
| 7,734,503 | B2 | 6/2010 | Agarwal et al. |
| 7,945,485 | B2 | 5/2011 | Kane, Jr. et al. |
| 8,090,613 | B2 | 1/2012 | Kalb et al. |
| 8,156,519 | B1 | 4/2012 | Kleinmann |
| 8,239,242 | B2 | 8/2012 | Moukas et al. |
| 8,341,047 | B1 | 12/2012 | Furney et al. |
| 8,396,742 | B1 | 3/2013 | Blume et al. |
| 8,522,270 | B2 | 8/2013 | Chatter et al. |
| 8,555,308 | B1 | 10/2013 | Kleinmann |
| 8,700,462 | B2 | 4/2014 | Collins |
| 8,706,548 | B1 | 4/2014 | Blume et al. |
| 8,744,908 | B2 | 6/2014 | Kalb et al. |
| 8,775,251 | B1 | 7/2014 | Archak et al. |
| 8,781,875 | B2 | 7/2014 | Chatter et al. |
| 8,788,339 | B2 | 7/2014 | Hughes et al. |
| 8,838,560 | B2 | 9/2014 | Grieselhuber et al. |
| 8,924,558 | B2 | 12/2014 | Gross |
| 9,058,406 | B2 | 6/2015 | Soroca et al. |
| 9,118,963 | B2 | 8/2015 | Balakrishnan et al. |
| 10,158,727 | B1 | 12/2018 | Mukhopadhyaya et al. |
| 2003/0115099 | A1 | 6/2003 | Burns, Jr. et al. |
| 2004/0044566 | A1 | 3/2004 | Bostelmann et al. |
| 2004/0068435 | A1 | 4/2004 | Braunzell |
| 2007/0027757 | A1 | 2/2007 | Collins et al. |
| 2007/0050245 | A1 | 3/2007 | Humphries, IV et al. |
| 2007/0121848 | A1 | 5/2007 | Faber et al. |
| 2007/0192356 | A1* | 8/2007 | O'Kelley ............ G06Q 30/02 |
| 2007/0233565 | A1 | 10/2007 | Herzog et al. |
| 2007/0240050 | A1 | 10/2007 | Quinn-Jacobs |
| 2007/0260736 | A1 | 11/2007 | Miller |
| 2008/0052278 | A1 | 2/2008 | Zlotin et al. |
| 2008/0097813 | A1 | 4/2008 | Collins et al. |
| 2008/0103953 | A1 | 5/2008 | Flake et al. |
| 2008/0120165 | A1 | 5/2008 | Yan |
| 2008/0275775 | A1 | 11/2008 | Gonen et al. |
| 2008/0288347 | A1 | 11/2008 | Sirfy |
| 2009/0043597 | A1 | 2/2009 | Agarwal |
| 2009/0048902 | A1* | 2/2009 | Lynn ............... G06Q 10/06375 |
| | | | 705/7.37 |
| 2009/0070251 | A1 | 3/2009 | Gonen et al. |
| 2009/0172551 | A1 | 7/2009 | Kane et al. |
| 2009/0276305 | A1 | 11/2009 | Clopp |
| 2010/0121624 | A1 | 5/2010 | Roy et al. |
| 2010/0241745 | A1 | 9/2010 | Offen et al. |
| 2010/0262455 | A1 | 10/2010 | Karlsson et al. |
| 2011/0071899 | A1 | 3/2011 | Robertson et al. |
| 2011/0313807 | A1 | 12/2011 | Envarli et al. |
| 2011/0313865 | A1 | 12/2011 | Sinyagin et al. |
| 2012/0296712 | A1 | 11/2012 | Morris |
| 2012/0303447 | A1 | 11/2012 | Hughes et al. |
| 2012/0310745 | A1 | 12/2012 | Bhatia et al. |
| 2013/0073473 | A1 | 3/2013 | Heath |
| 2013/0085807 | A1 | 4/2013 | Cincotta |
| 2013/0173574 | A1 | 7/2013 | Park et al. |
| 2013/0197996 | A1 | 8/2013 | Dunham et al. |
| 2013/0325668 | A1 | 12/2013 | Fischburg |
| 2013/0332274 | A1 | 12/2013 | Faith et al. |
| 2014/0006129 | A1 | 1/2014 | Heath |
| 2014/0040009 | A1* | 2/2014 | Shi ................ G06Q 30/02 |
| | | | 705/14.42 |
| 2014/0040011 | A1 | 2/2014 | Kim |
| 2014/0040715 | A1 | 2/2014 | Younge et al. |
| 2014/0040806 | A1 | 2/2014 | Anderson et al. |
| 2014/0046754 | A1 | 2/2014 | Lee et al. |
| 2014/0046777 | A1 | 2/2014 | Markey et al. |
| 2014/0095427 | A1 | 4/2014 | Fox et al. |
| 2014/0164383 | A1 | 6/2014 | Tang et al. |
| 2014/0236738 | A1 | 8/2014 | Subramanian et al. |
| 2014/0258177 | A1 | 9/2014 | Thorsen |
| 2014/0278959 | A1 | 9/2014 | Nukala et al. |
| 2014/0324583 | A1 | 10/2014 | Chen et al. |
| 2015/0051987 | A1 | 2/2015 | Greif et al. |
| 2015/0066628 | A1 | 3/2015 | Ghosh et al. |
| 2015/0073952 | A1 | 3/2015 | Ventura et al. |
| 2015/0199715 | A1 | 7/2015 | Caron et al. |
| 2015/0205793 | A1 | 7/2015 | James |
| 2015/0213481 | A1 | 7/2015 | Yuan |
| 2016/0125524 | A1 | 5/2016 | Loskamp |
| 2017/0060964 | A1 | 3/2017 | Kenthapadi et al. |
| 2017/0083938 | A1 | 3/2017 | Laufenberg et al. |
| 2017/0213235 | A1 | 7/2017 | Laufenberg et al. |
| 2018/0082328 | A1 | 3/2018 | Laufenberg et al. |
| 2018/0157753 | A1 | 6/2018 | Dougherty et al. |

OTHER PUBLICATIONS

Oleh Lehkyy; Irena Pidhurska; Taras Haida, Semantic Core Parsing in Search Engine Optimization Process (English), 2019 9th International Conference on Advanced Computer Information Technologies (ACIT)(pp. 358-361), Jun. 1, 2019 (Year: 2019).*
Non-Final Office Action dated Nov. 14, 2018, issued in connection with U.S. Appl. No. 14/856,870, filed Sep. 17, 2015, 26 pages.
Laufenberg et al., U.S. Appl.No. 15/005,372, filed Jan. 25, 2016, 83 pages.
Laufenberg et al., U.S. Appl. No. 15/267,472, filed Sep. 9, 2016, 78 pages.
Laufenberg et al., U.S. Appl. No. 15/334,516, filed Oct. 26, 2016, 2016, 80 pages.
Nee, Daniel, "Collaborative Filtering using Alternating Least Squares," Machine Learning, 2016, 7 pages.
Koren et aL, "Advances in Collaborative Filtering," Recommender Systems Handbook, 2010, pp. 145-186.
Non-Final Office Action dated Mar. 6, 2019, issued in connection with U.S. Appl. No. 15/005,372, filed Jan. 25, 2016, 21 pages.
Non-Final Office Action dated Apr. 30, 2019, issued in connection with U.S. Appl. No. 15/334,516, filed Oct. 26, 2016, 17 pages.
Final Office Action dated Mar. 4, 2019, issued in connection with U.S. Appl. No. 15/267,472, filed Sep. 16, 2016, 16 pages.
Non-Final Office Action dated Mar. 27, 2019, issued in connection with U.S. Appl. No. 15/475,039, filed Mar. 27, 2019, 19 pages.
The International Search Report (ISR) for PCT/US2017/64465 dated Jan. 17, 2018, pp. 1-2.
The Written Opinion of the International Searching Authority for PCT/US2017/64465 dated Jan. 17, 2018, pp. 1-5.
The International Search Report (ISR) for PCT/US2017/51556 dated Dec. 7, 2017, pp. 1-4.
Written Opinion of the International Searching Authority for PCT/US2017/51556 dated Dec. 7, 2017, pp. 1-7.
The International Search Report (ISR) for PCT/US2017/56556 dated Jan. 5, 2018, pp. 1-4.
Written Opinion of the International Searching Authority for PCT/US2017/56556 dated Jan. 5, 2018, pp. 1-7.
Non-Final Office Action dated Aug. 7, 2017, issued in connection with U.S. Appl. No. 15/611,226, filed Jun. 1, 2017, 19 pages.
International Searching Authority, International Search Report and Written Opinion dated Apr. 6, 2017, issued in connection with International Application No. PCT/US2017/014736, filed on Jan. 24, 2017, 13 pages.
International Searching Authority, International Search Report and Written Opinion dated Nov. 7, 2016, issued in connection with International Application No. PCT/US2016/050358 filed on Sep. 6, 2016, 11 pages.
Laufenberg et al., U.S. Appl. No. 14/856,870, filed Sep. 17, 2015, 69 pages.
Laufenberg et al., U.S. Appl. No. 151267,472, filed Sep. 9, 2016, 78 pages.

(56) References Cited

OTHER PUBLICATIONS

"About your account organization," AdWords Help, Oct. 20, 2016, 2 pages, https://supportgoogle.com/adwords/answer/1704396?hl=en.

"Display advertising," Wikipedia, Oct. 20, 2016, 4 pages, https://en.wikipedia.orgiwiki/Display_advertising.

"Search engine marketing," Wikipedia, Oct. 20, 2016, 6 pages, https://en.wikipedia.org/wiki/Search_engine_marketing.

International Preliminary Report on Patentability for PCT/US2016/050358 dated Mar. 20, 2018, 9 pages.

International Search Report and Written Opinion for PCT/US2017/57972 dated Jan. 2018, 8 pages.

Non-Final Office Action dated Aug. 8, 2018, issued in connection with U.S. Appl. No. 15/267,472, filed Sep. 16, 2016, pp. 1-17.

Final Office Action dated Jan. 23, 2020, issued in connection with U.S. Appl. No. 14/856,870, filed Sep. 17, 2015, 28 pages.

Non-Final Office Action dated Aug. 7, 2019, issued in connection with U.S. Appl. No. 14/856,870, filed Sep. 17, 2015, 26 pages.

\* cited by examiner

700

SEARCH | CELL PHONE REPAIR | 702

| AD | BROKEN CELL PHONE? – WEFIXIT123.COM<br>WWW.WEFIXIT123.COM  312-555-1212<br>SAME DAY CELL PHONE AND TABLET REPAIR | 704 |

| AD | ELECTRODE SHACK FIXES IT – ELECTRODE SHACK OF GREATER CHICAGO<br>WWW.ELECTRODESHACK456.COM  847-555-1212<br>PHONE REPAIR STARTING AT $49.99 | 706 |

| AD | DROPPED YOUR PHONE? – I DROPPED IT REPAIR<br>WWW.IDROPPEDIT789.COM  630-555-1212<br>PROFESSIONAL PHONE REPAIR AND SERVICE | 708 |

CHICAGO PHONE REPAIR | REPAIRS AND PARTS
WWW.PHONEREPAIRCHICAGO321.COM  708-555-1212
GET AN IMMEDIATE ONLINE QUOTE FOR YOUR REPAIR — 710

CHICAGO, IL | CELL PHONE REPAIR
WWW.PHONEDOCTOR654.COM  805-555-1212
PHONE DOCTOR IS A CHICAGO SHOP SPECIALIZING IN IPHONE REPAIR — 712

IPHONE AND IPAD REPAIR | CHICAGO
WWW.CELLPHONEREPAIR987.COM  773-555-1212
EXTEND THE LIFE OF YOUR IPHONE, TABLET, OR LAPTOP — 714

BANNER AD    718

ARTICLE HEADLINE ← 720

LOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD EXERCITATION ULLAMCO LABORIS NISI UT ALIQUIP EX EA COMMODO CONSEQUAT. DUIS AUTE IRURE DOLOR IN REPREHENDERIT IN VOLUPTATE VELIT ESSE CILLUM DOLORE EU FUGIAT NULLA PARIATUR. EXCEPTEUR SINT OCCAECAT CUPIDATAT NON PROIDENT, SUNT IN CULPA QUI OFFICIA DESERUNT MOLLIT ANIM ID EST LABORUM.

724

SIDEBAR AD

| Report | Performance | | View | Channel | | | | No Segment | | | | Columns ∨ | |
|---|---|---|---|---|---|---|---|---|---|---|---|---|---|
| Channel | | | | Performance | | | | Cost | | | Revenue | | |
| | Impr. | Clicks | CTR | Conv. | Conv. Rate | Cost | CPM | CPC | CPA | Rev. | RPC | AOV | ROAS |
| Summary | 50,593,973 | 1,099,570 | 2.17% | 37,089 | 3.37% | $58,145.49 | $1.15 | $0.05 | $1.56 | $0.00 | $0.00 | $0.00 | $0.00 |
| Paid Search | 2,931,406 | 137,806 | 4.70% | 16,302 | 11.83% | $50,815.97 | $9.93 | $0.36 | $3.03 | $0.00 | $0.00 | $0.00 | $0.00 |
| SEO | 7,367,754 | 927,682 | 12.24% | 16,556 | 1.78% | --- | --- | --- | --- | $0.00 | $0.00 | $0.00 | $0.00 |
| Display | 40,294,813 | 34,082 | 0.08% | 4,231 | 0.01% | $7,329.52 | $0.18 | $0.22 | $1.73 | $0.00 | $0.00 | $0.00 | $0.00 |

Showing 3 entries

FIG. 8G

| Report | Performance | | View | | | Segment | | | | | | Columns ∨ | |
|---|---|---|---|---|---|---|---|---|---|---|---|---|---|
| Channel | | | | Channel | | No Segment | | | | | Revenue | | |
| | | | | Trend of Week | | By Channel | | | | | | | |
| | Impr. | Clicks | CTR | Trend of Month | | | | CPC | CPA | Rev. | RPC | AOV | ROAS |
| Summary | 50,593,973 | 1,099,570 | 2.17% | | | | | | $1.56 | $0.00 | $0.00 | $0.00 | $0.00 |
| Paid Search | 2,931,406 | 137,806 | 4.70% | | | | | | $3.03 | $0.00 | $0.00 | $0.00 | $0.00 |
| SEO | 7,367,754 | 927,682 | 12.24% | | | | | | --- | $0.00 | $0.00 | $0.00 | $0.00 |
| Display | 40,294,813 | 34,082 | 0.08% | 4,231 | 0.01% | $7,329.52 | $0.18 | $0.22 | $1.73 | $0.00 | $0.00 | $0.00 | $0.00 |

Showing 3 entries

| Report | Performance | | View | Trend of Week | ∨ | By Channel | ∨ | | | | | Columns ∨ | |
|---|---|---|---|---|---|---|---|---|---|---|---|---|---|
| | | | | | | | Performance | | | Cost | | | |
| Week | Channel | Impr. | Clicks | CTR | Conv. | Conv. Rate | Cost | CPM | CPC | CPA | Rev. | RPC | AOV |
| | | 50,593,973 | 1,099,570 | 2.17% | 37,089 | 3.37% | $58,145.49 | $1.15 | $0.05 | $1.56 | $0.00 | $0.00 | $0.00 |
| 6/26/2016 | Paid Search | 488,567 | 22,967 | 4.70% | 2,717 | 11.83% | $8,469 | $9.93 | $0.36 | $3.03 | $0.00 | $0.00 | $0.00 |
| 6/26/2016 | SEO | 1,227,959 | 154,613 | 12.59% | 2,759 | 1.78% | --- | --- | --- | --- | $0.00 | $0.00 | $0.00 |
| 6/26/2016 | Display | 6,715,802 | 5,680 | 0.08% | 705 | 0.01% | $1,221.58 | $0.18 | $0.22 | $1.73 | $0.00 | $0.00 | $0.00 |
| 7/3/2016 | Paid Search | 488,567 | 22,967 | 4.70% | 2,717 | 11.83% | $8,469 | $9.93 | $0.36 | $3.03 | $0.00 | $0.00 | $0.00 |
| 7/3/2016 | SEO | 1,227,959 | 154,613 | 12.59% | 2,759 | 1.78% | --- | --- | --- | --- | $0.00 | $0.00 | $0.00 |
| 7/3/2016 | Display | 6,715,802 | 5,680 | 0.08% | 705 | 0.01% | $1,221.58 | $0.18 | $0.22 | $1.73 | $0.00 | $0.00 | $0.00 |
| 7/10/2016 | Paid Search | 488,567 | 22,967 | 4.70% | 2,717 | 11.83% | $8,469 | $9.93 | $0.36 | $3.03 | $0.00 | $0.00 | $0.00 |
| 7/10/2016 | SEO | 1,227,959 | 154,613 | 12.59% | 2,759 | 1.78% | --- | --- | --- | --- | $0.00 | $0.00 | $0.00 |
| 7/10/2016 | Display | 6,715,802 | 5,680 | 0.08% | 705 | 0.01% | $1,221.58 | $0.18 | $0.22 | $1.73 | $0.00 | $0.00 | $0.00 |

Showing 1-9 of 18 entries, 9 ∨ rows Page: |◄ ◄ 01 ▼ ► ►|

FIG. 8H

| Report | Performance | View | Channel | | | No Segment | | | | | | Columns ∨ | |
|---|---|---|---|---|---|---|---|---|---|---|---|---|---|
| | | | Performance | | | | | Cost | | | | Revenue | |
| Channel | Impr. | Clicks | CTR | Conv. | Conv. Rate | Cost | CPM | CPC | CPA | Rev. | | | ROAS |
| Summary | 50,593,973 | 1,099,570 | 2.17% | 37,089 | 3.37% | $58,145.49 | $1.15 | $0.05 | $1.56 | $0.00 | | | $0.00 |
| Paid Search | 2,931,406 | 137,806 | 4.70% | 16,302 | 11.83% | $50,815.97 | $9.93 | $0.36 | $3.03 | $0.00 | | | $0.00 |
| SEO | 7,367,754 | 927,682 | 12.24% | 16,556 | 1.78% | — | — | — | — | $0.00 | | | $0.00 |
| Display | 40,294,813 | 34,082 | 0.08% | 4,231 | 0.01% | $7,329.52 | $0.18 | $0.22 | $1.73 | $0.00 | | | $0.00 |

Showing 3 entries

Columns:
☑ Impressions
☑ Clicks
☑ CTR
☑ Conversions
☑ Conversion Rate
☑ Cost
☑ CPM
☑ CPC
☑ CPA
☑ Revenue
☑ RPC
☑ AOV
☑ ROAS

FIG. 8I

INTERACTIVE DATA-DRIVEN GRAPHICAL USER INTERFACE FOR CROSS-CHANNEL WEB SITE PERFORMANCE

CROSS-REFERENCE TO RELATED APPLICATIONS

This application claims priority to U.S. provisional patent application No. 62/407,840, filed Oct. 13, 2016; and U.S. provisional patent application No. 62/430,134, filed Dec. 5, 2016. These applications are hereby incorporated by reference in their entirety.

BACKGROUND

Online advertising uses the Internet or other data networks to provide promotional and marketing messages to consumers and/or potential customers. It includes web-based advertising, email advertising, search engine advertising, social media advertising, and mobile advertising. The parties involved include an advertiser, who provides advertisement (ad) copy, a publisher, who integrates the ads into its online content, and a user, who is presented with the online ads. An online advertising service may match advertisers with publishers, and may select the specific ads that are viewed by particular users that access the publisher's content. Another potential participant is an advertising agency, who may help generate and place the ad copy.

Unlike traditional print, radio, and television advertising, online advertising allows hyper-focused targeting of ads to particular users, groups of users, and other channels. Nevertheless, regardless of targeting, it currently lacks the tools for advertisers and advertising agencies to be able to manage advertising budgets on a granular scale or to determine, in near-real-time, the efficacy of the advertisements placed across multiple channels.

SUMMARY

The embodiments herein involve, but are not limited to, ways in which online advertising performance information can be displayed on a graphical user interface so that an advertiser can rapidly determine and compare the effectiveness of one or more channels relating to online advertising metrics or measured website traffic. In particular, the computer implementations described hereafter may automatically retrieve online advertising placement and conversion information from one or more remote networked sources, and provide a graphical user interface that presents this information in a logical and readable fashion. The advertiser can filter and/or modify the display to focus on information that is relevant to the advertiser's goals.

For instance, the graphical user interface might plot the cost of advertising and conversions for a particular channel compared to the cost of advertising and conversions for another channel over a time period (e.g., the last month). By way of this display, the advertiser can rapidly determine which channels are performing to expectations. For instance, anomalies or discrepancies may be readily apparent in the display, prompting the advertiser to explore these areas further. The graphical user interfaces may also allow the advertiser to "drill down" into specific data to facilitate this exploration so that the advertiser can intelligently and rapidly allocate funds from one channel to another. Furthermore, the graphical user interfaces may support measured website traffic relating to website design and organization. Thus, the embodiments herein solve technical problems associated with the displaying of relevant online advertising performance information on a graphical user interface.

A first example embodiment may involve visualizing cross-channel web site performance, including channels for paid search engine listings, display promotions, and non-paid search engine listings for a web site. The first example embodiment may involve receiving, from one or more server devices, representations of past amounts spent on the paid search engine listings for the web site and representations of paid search conversions involving the web site that are attributable to the paid search engine listings. The first example embodiment may further involve receiving, from the one or more server devices, representations of past amounts spent on the display promotions for the web site and representations of display conversions involving the web site. The display conversions may be attributable to the display promotions. The first example embodiment may further involve receiving, from one or more traffic tracking servers, representations of the non-paid search engine listings for the web site and representations of past traffic statistics for the web site. The non-paid search engine listings may specify search result positions in which the web site has been placed. Non-paid search conversions attributable to the non-paid search engine listings may be derived from the past traffic statistics.

The first example embodiment may further involve storing, in a database, metric representations of the past amounts spent on the paid search engine listings, the paid search conversions, the past amounts spent on display promotions, the display conversions, the non-paid search engine listings, and the non-paid search conversions. The first example embodiment may further involve receiving, from a client device, a request for a graphical representation of the cross-channel performance of the web site with respect to conversions.

The first example embodiment may further involve in response to receiving the request for the graphical representation of the cross-channel performance of the web site, querying the database to obtain the metric representations, and transmitting, to the client device, the graphical representation of the cross-channel performance of the web site. The graphical representation may include (i) a graph plotting, for a pre-defined past period of time on an x-axis of the graph, the past paid search conversions, the past display conversions, and the past non-paid search conversions, where the x-axis may be in units of days, and (ii) a table displaying the metric representations for the pre-defined past period of time. Columns of the table may represent each of conversions and past amounts spent. Rows of the table may represent each of the paid search engine listings, the display promotions, and the non-paid search engine listings.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor, cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts paid search advertising, according to an example embodiment.

FIG. 7B depicts display advertising, according to an example embodiment.

FIG. 8F depicts a cross channel insights graphical user interface, according to an example embodiment.

FIG. 8G depicts a cross channel insights graphical user interface, according to an example embodiment.

FIG. 8H depicts a cross channel insights graphical user interface, according to an example embodiment.

FIG. 8I depicts a cross channel insights graphical user interface, according to an example embodiment.

DETAILED DESCRIPTION

Figure 1:
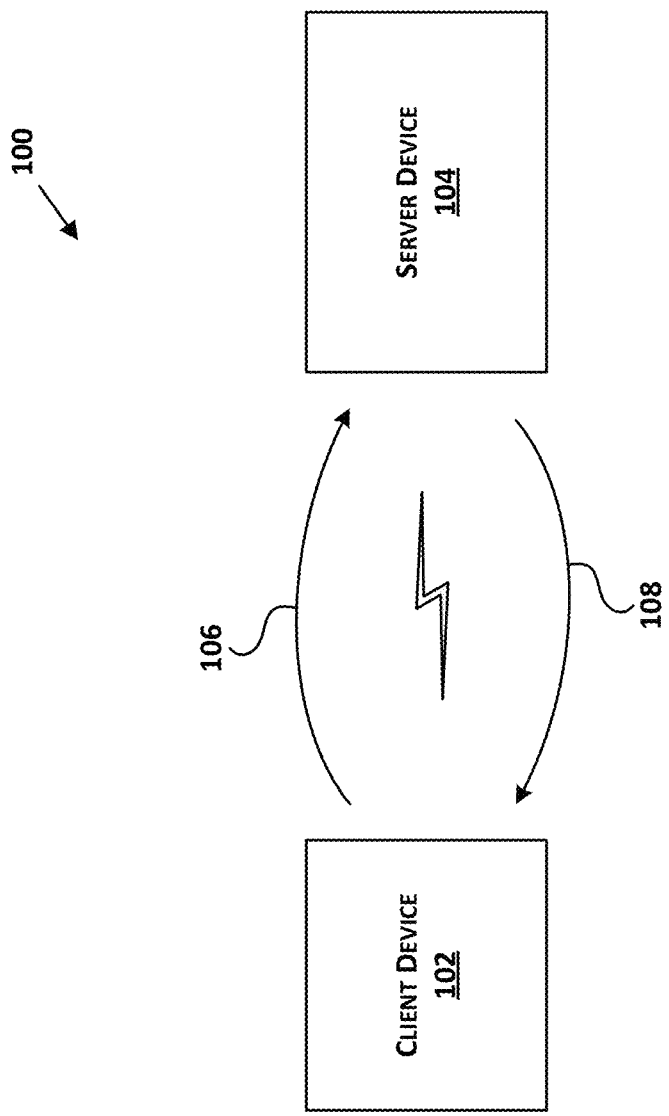
FIG. 1 is a high-level depiction of a client-server computing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

1. Overview

As noted above, online advertising services may facilitate the offering of specific ads from advertisers to particular users. In some embodiments, an online advertising service may partner with publishers (e.g., web sites, search engines, social networks, mobile applications, etc.) that deliver content to users. The advertiser may submit ads for the online advertising service to place, and the online advertising service may select specific ads to display for each affiliated publisher. The ads may be selected dynamically so that they are likely to be related to the content being viewed, or of interest to users that typically view the content. Alternatively or additionally, when demographic or personal information about a particular user is known, the ads may be targeted to that particular user. In some cases, the online advertising service may be a publisher itself; for instance, a search engine operator may allow advertisers to place ads that are integrated with its search results.

Payment models for online advertising vary. In some models, known as cost-per-mille (CPM), advertisers pay a specific amount for every 1000 ads requested by users' devices and sent to those devices (these views are sometimes called "impressions"). On the other hand, in pay-per-click (PPC) models, the advertiser pays when users click on or select a displayed ad, indicating further interest in the product or service being advertised. Newer models include pay-per-performance (PPP) or pay-per-engagement (PPE) advertising, in which the advertiser pays when the user undertakes a particular set of one or more actions. These actions may result in leads for the advertiser, such as users filling out an online form, accessing a particular uniform resource locator (URL), downloading a particular file, watching a particular video, or dialing a particular phone number. These actions may also include conducting an online purchase of a particular product or service.

Regardless of the payment model, the advertiser's payment may be divided, in some fashion, between the content provider serving the ads and the online advertising service. For instance, the content provider may obtain 70% of each unit of payment, while the online advertising service obtains the remaining 30%.

Some online advertising services operate under an auction model. Advertisers may select, for instance, keywords or keyphrases with which they would like their ads associated, as well as a bid amount. The online advertising service then, in turn, displays the ad of a selected bidder (e.g., the highest bidder) on web pages or other media that also display (or are otherwise associated with) the selected bidder's keywords or keyphrases. For example, ads bundled with the keywords "auto," "automobile," and "car" may be displayed on web sites or other media that contain content related to cars and/or driving. In some cases, the online advertising service may display the ad to a user contextually associated with the selected keywords or keyphrases. The user may have, in the past, expressed interest in these keywords or keyphrases, or is deemed likely to have such an interest. Thus, in the case of the above example, if the user is deemed interested in cars, the ads may be displayed to a user in web sites or other media that are not related to cars and/or driving.

The terms "keywords" and "keyphrases" may refer to single words and groups of words, respectively. For sake of convenience, these terms may be used interchangeably herein.

Measuring the effectiveness of online advertising campaigns can be challenging given the variety of online advertising services and payment models. An advertiser may wish to distribute its advertising budget across more than one online advertising service, and/or may wish to use multiple payment models. The effectiveness may be measured in terms of conversions—the number of users who engaged with the ads of the campaign. But several types of conversions exist: impressions, click-throughs, leads, downloads, phone calls, purchases, as well as any other type of activity that the advertiser has defined as valuable. Some of these conversion types may involve assisted conversions. Additional categories of conversions may exist.

For instance, assisted conversions include interactions that a user has with publishers leading up to a conversion. For example, if conversions are measured in terms of purchases, the user may visit a particular publisher several times before conducting the actual purchase. These visits may be information gathering exercises for the user. Nonetheless, the non-purchase visits may be tracked as "assists" and the eventual purchase may be categorized as an assisted conversion.

Online advertising services may be able to track the number of impressions and click-throughs for each ad. However, these services might not have the information to determine that a user who viewed an ad later expressed further interest in, or purchased, a related product. Thus, conversion information regarding the effectiveness of online advertising is currently available only in limited situations.

The embodiments herein support methods, devices, and systems for providing a more complete view of an advertiser's conversions. These embodiments collect and aggregate information from one or more online advertising services, as well as traffic tracking services and other services, to enable near-real-time monitoring of advertising spending and advertising conversions. With this information, advertisers and/or their advertising agencies may be able to make faster, more informed decisions about how to allocate their advertising budgets to ad copy, online advertising services, advertising channels, and/or publishers. For instance, in the past, detailed information regarding conversions was largely unavailable. When this information was available, processing it into a format that could be analyzed would take days. At that point, any recent anomalies had occurred too far in the past to address. With the embodiments herein, anomalies can be identified in hours or minutes and addressed in real time.

Particularly, the embodiments herein describe interactive data-driven graphical user interfaces, possibly in the form of web pages, that allow an advertiser to rapidly compare various types of data related to the performance of online advertisement. For instance, an advertiser and/or their advertising agency may be able to compare, at a glance, the amount spent on online advertising over a particular defined time period to conversions as a result of the advertising for that time period. Similarly, with inputs to the graphical user interfaces, these parties may be able to switch to comparing the number of ad impressions over the particular defined time period to the cost of advertising for that time period. The graphical user interfaces may visually identify how well the advertising spending or advertising impressions correlate to conversions.

In this way, the parties may be able to rapidly determine the effectiveness of each of their advertising campaigns, and whether they should change strategies for any of these campaigns. For instance, the parties may decide to discontinue a campaign with a low conversion rate, and re-allocate that budget to a campaign with a higher conversion rate. On the other hand, the parties may decide to increase the advertising budgets for important campaigns with lower than expected conversion rates.

In a specific example, it is currently difficult to determine the cost-effectiveness of different types of conversions within one advertising service versus another. For instance, an advertiser may be utilizing paid search advertising, display advertising, and/or search engine optimization ("SEO"). Each of these types of advertising may be considered to be a channel through which the advertiser attempts to reach its audience. The embodiments herein allow an advertiser to analyze different types of conversions across multiple channels to better allocate advertising resources. The embodiments herein also allow rapid determination of conversion attribution (e.g., what types of advertisements lead to conversions), and how conversions are related to advertisement quality and the type of channel used.

While the embodiments herein are described as providing web-based interfaces, other types of interfaces may be used instead. For instance, any of the web-based interfaces herein may be replaced by interfaces of standalone applications for personal computers, tablets, smartphones, etc. Further, even though online advertising agencies are described throughout this disclosure as placing ads on behalf of advertisers, these agencies are not necessary. Thus, the embodiments herein may be used by advertisers themselves without assistance from an online advertising agency.

Regardless of how they may be implemented, the embodiments herein may make use of one or more computing devices. These computing devices may include, for example, client devices under the control of users, and server devices that directly or indirectly interact with the client devices. Such devices are described in the following section.

2. Example Computing Devices and Cloud-Based Computing Environments

FIG. 1 illustrates an example communication system 100 for carrying out one or more of the embodiments described herein. Communication system 100 may include computing devices. Herein, a "computing device" may refer to either a client device 102, a server device 104 (e.g., a stand-alone server computer or networked cluster of server equipment), or some other type of computational platform.

Client device 102 may be any type of device including a personal computer, laptop computer, a wearable computing device, a wireless computing device, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireline or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations relating to the data sent to, or received from, server device 104. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein. Further, server device 104 may be configured to send data 108 to and/or receive data 106 from the client device 102.

Data 106 and data 108 may take various forms. For example, data 106 and 108 may represent packets transmitted by client device 102 or server device 104, respectively, as part of one or more communication sessions. Such a communication session may include packets transmitted on a signaling plane (e.g., session setup, management, and teardown messages), and/or packets transmitted on a media plane (e.g., text, graphics, audio, and/or video data).

Regardless of the exact architecture, the operations of client device 102, server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
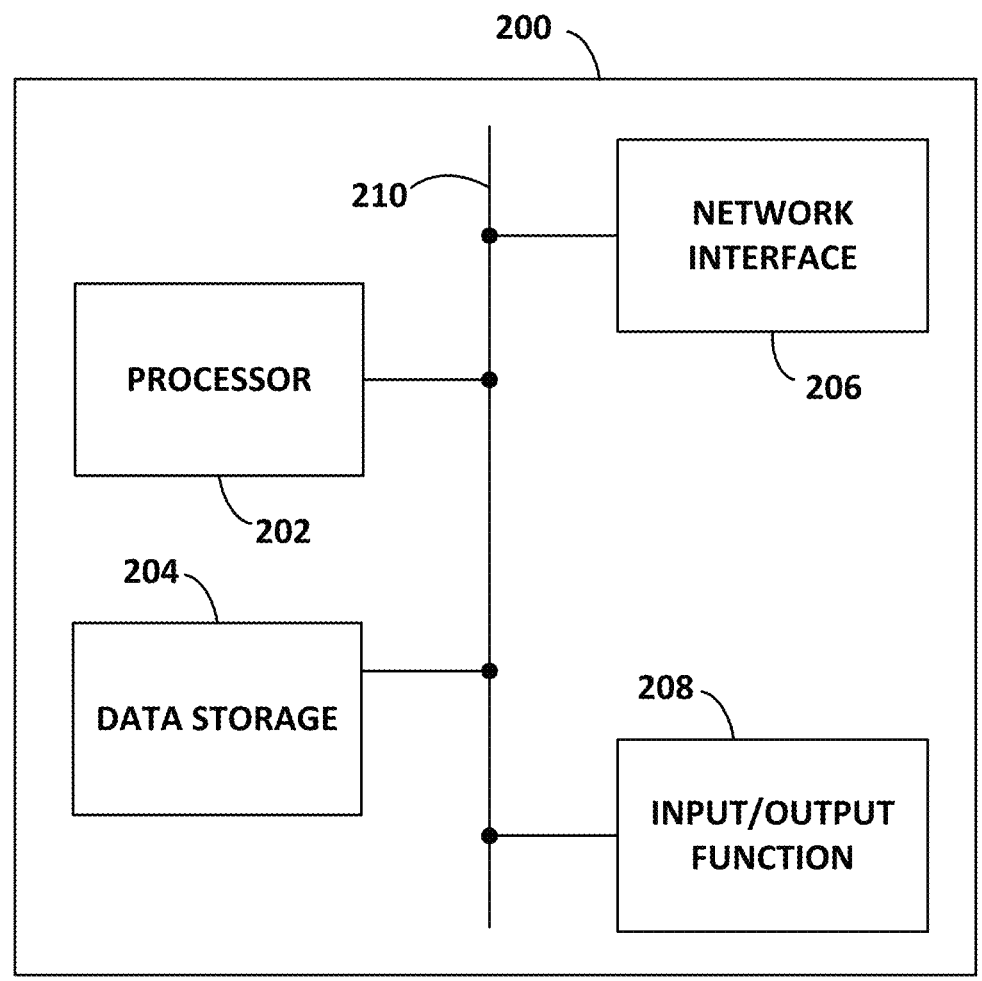
FIG. 2 illustrates a schematic drawing of a computing device, according to an example embodiment.

FIG. 2 is a simplified block diagram exemplifying a computing device 200, illustrating some of the functional components that could be included in a computing device arranged to operate in accordance with the embodiments herein. Example computing device 200 could be a client device, a server device, or some other type of computational platform. For purpose of simplicity, this specification may equate computing device 200 to a server from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more central processing units (CPUs), such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile memory and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software. By way of example, the data in data storage 204 may contain program instructions, perhaps stored on a non-transitory, computer-readable medium, executable by processor 202 to carry out any of the methods, processes, or operations disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
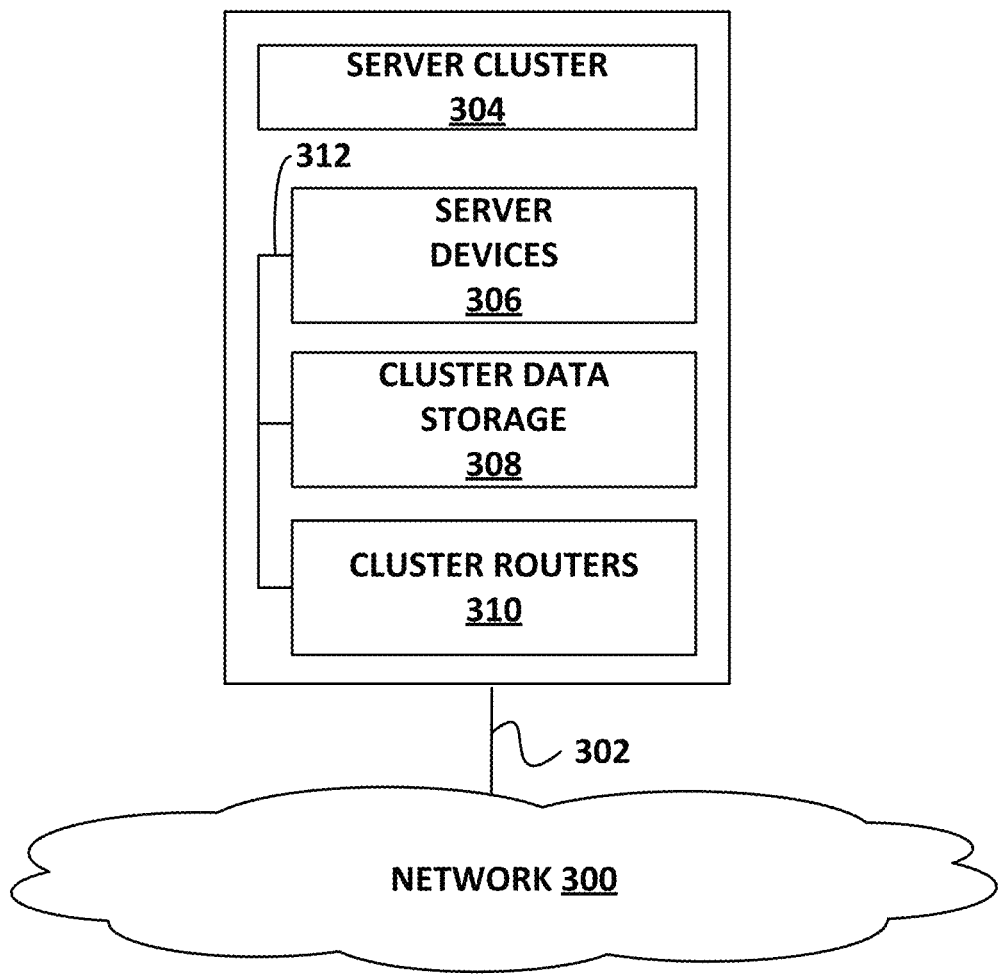
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as server device 104 (as exemplified by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purpose of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of hard disk drives. The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database, such as a structured query language (SQL) database. Various types of data structures may store the information in such a database, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries or other types of database queries, and the output of such queries, respectively. Additional text, images, video, and/or audio may be included as well. Furthermore, server devices 306 may organize the received data into web page representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

3. Example Online Advertising Architectures and Conversion Tracking

Figure 4:
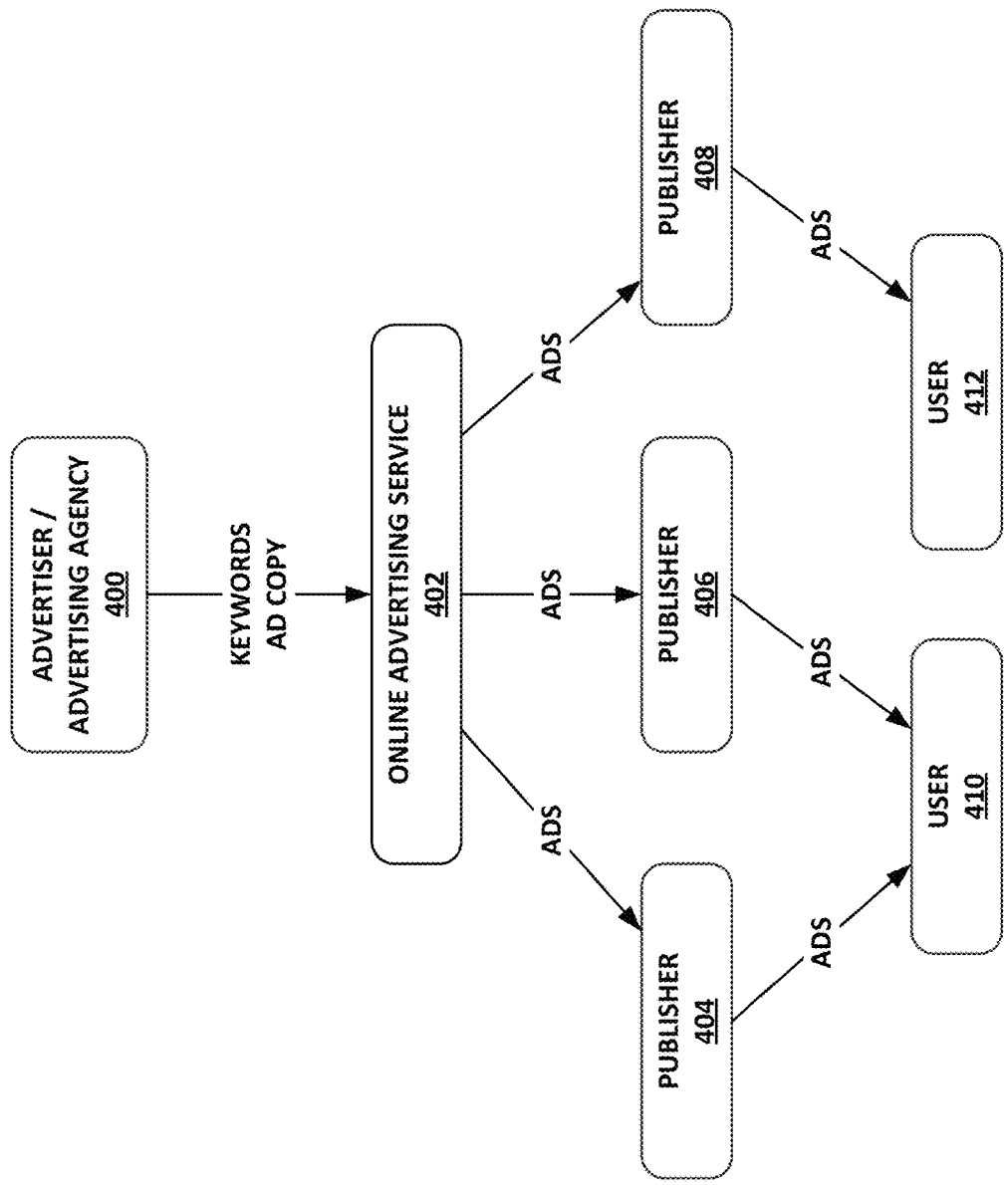
FIG. 4 depicts an online advertising diagram, according to an example embodiment.

FIG. 4 depicts an online advertising diagram, according to an example embodiment. In FIG. 4, advertiser/advertising agency 400 may provide keywords, ad placement information, and/or ad copy to online advertising service 402. The advertiser and the advertising agency may, for example, work together to select the keywords, select target placements, and develop the ad copy. On the other hand, either of these parties may operate independently from the other when selecting the keywords, selecting the target placements and developing the ad copy. In some embodiments, the advertiser hires the advertising agency to manage the advertiser's online advertising. The advertising agency may also assist the advertiser with other aspects of marketing strategies, branding strategies and/or sales promotions.

Regardless of the exact relationship between the advertiser and the advertising agency, the online advertising may be associated with one or more spending goals and/or conversion goals defined by either party. These goals may take various forms. In some possible examples, the spending goals may include a monthly advertising budget, perhaps with day-by-day spending sub-goals, and the conversion goals may include a target number of monthly conversions, perhaps with day-by-day conversion sub-goals. The conversion goals may also specify how these conversions can be counted. Other possibilities exist.

Online advertising service 402 may be an entity that receives keywords and associated ad copy from one or more advertisers and/or advertising agencies, and provides the ad copy to publishers for display to users. As shown in FIG. 4, online advertising service 402 may provide one or more ads to publishers 404 and 406 that are viewed by user 410, and one or more ads to publisher 408 that are viewed by user 412. Examples of online advertising services include Google's ADWORDS®, Microsoft's BING® Ads, Automattic's WORDADS®, and so on.

Publishers 404, 406, and 408 may be entities that operate and/or provide web sites, social networks, personal computer applications, mobile applications, search engines, and so on. Each of these types of publishers may provide content potentially of interest to users. Along with this content, publishers 404, 406, and 408 may also provide various types of ads to the users, such as text-based ads, banner ads, column ads, video ads, overlay ads, interstitial ads, etc.

Users 410 and 412 may be individuals accessing the content at publishers 404, 406, and 408. Before, during, and/or after viewing this content, users may view ads. In some cases, users 410 and 412 may be required to view a certain extent of an ad, or view the ad for a certain period of time, before the content is displayed.

Other arrangements with more advertisers, advertising agencies, online advertising services, publishers, and users are possible. In some cases, the number of advertisers, publishers, and/or users may be in the thousands or millions.

As noted above, the ads provided to a particular publisher may be selected to be related to that publisher's content. For instance, if publisher 408 is a web site providing information on automobiles, online advertising service 402 may provide ad copy associated with the keyword "car" to publisher 408. Alternatively or additionally, when the online advertising service has access to information regarding a particular user that is viewing a publisher's content, the online advertising service may provide ads related to known interests of the particular user. Thus, for instance, if user 410 is known to be interested in automobiles, the online advertising service may provide ad copy associated with the keyword "car" to publishers 404 and/or 406 for display to user 410, even if the content that these publishers provide is not related to automobiles.

Figure 5A:
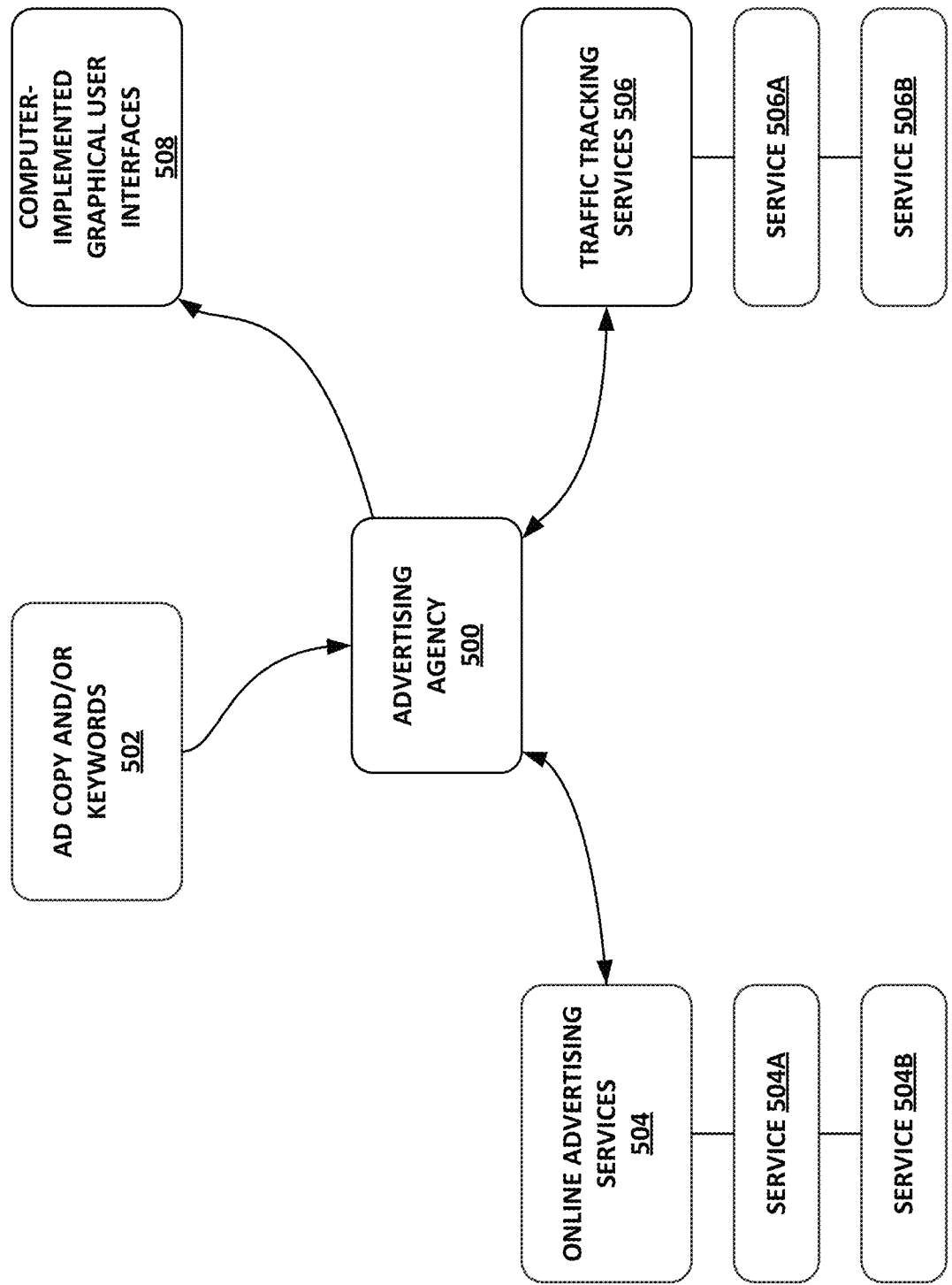
FIG. 5A depicts an advertising agency offering graphical user interfaces that provide information on cross channel advertising performance, according to an example embodiment.

FIG. 5A depicts an advertising agency 500 offering graphical user interfaces that provide information regarding cross channel advertising performance, according to an example embodiment. Advertising agency 500 may place ads with one or more online advertising services 504 on behalf of one or more advertisers.

Each advertiser may provide ad copy, ad placement information, and/or keywords 502 to advertising agency 500. Ad copy may include text, graphics, audio, and/or video that make up an online ad. Keywords may include one or more words or phrases that the advertiser seeks to associate with the ad copy. In some cases, the ad copy, ad placement information, and/or keywords may be developed by the advertiser, both the advertiser and advertising agency 500, or by advertising agency 500 with little or no input from the advertiser.

Given ad copy, ad placement information, and/or keywords 502, advertising agency 500 may place ads with one or more of online advertising services 504. As just one example, service 504A may be Google's ADWORDS®, while service 504B may be Microsoft's BING® Ads. Thus, advertising agency 500 may provide the ad copy and associated keywords to one or more of online advertising services 504. In some cases, the same ad copy and keywords may be used for each service, and in other cases, ad copy and keywords may differ between at least some of these services. Once the ad copy and keywords are provided, online advertising services 504 may begin providing ads for their respective publishers to display to users.

As noted above, some online advertising services 504 may use a form of auction to determine the price that the advertiser is charged to place its ads. More specifically, the advertiser may bid to have an ad associated with one or more keywords. An online advertising service then, in turn, displays the ad of a selected bidder on web pages or other media that also display (or are otherwise associated with) the selected bidder's keywords. In some cases, the selected bidder may be the one that bid the highest amount. In general, however, other factors may be taken into consideration.

Figure 5B:
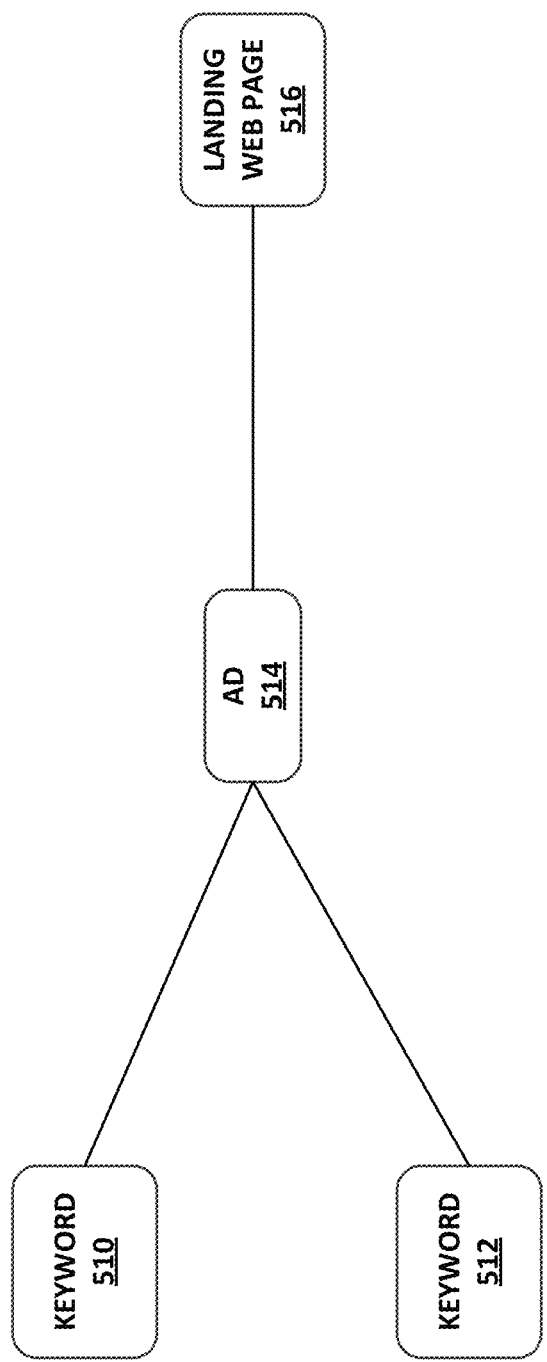
FIG. 5B depicts relationships between keywords, advertisements, and landing web pages, according to an example embodiment.

The relationships between keywords, ads, and web pages are illustrated in FIG. 5B. Therein, keywords 510 and 512 are associated with ad 514. This association may be made by an advertiser who would like users interested in keywords 510 or 512 to view ad 514. For example, ads associated with the keywords "automobile," and "car" may be displayed on a web site deemed to be relevant to these keywords.

If a user to which ad 514 is displayed clicks on, touches, or otherwise activates this ad, the user may be redirected to landing web page 516 (e.g., a click-through has occurred). In most cases, landing web page 516 contains information relevant to keywords 510 and 512. As an example, landing web page 516 may contain information about automobiles and cars. For instance, landing web page 516 may be the main web page of a car dealership, or a web page of the car dealership that displays information about a current sale taking place.

Clearly, advertisers would like to have their ads associated with certain keywords. But they are usually competing with other advertisers for this privilege, and the online advertising service ultimately decides which ads are associated with which keywords and for how long. In some cases, the online advertising service may allow multiple ads from the same or different advertisers to be simultaneously associated with the same keywords. For example, a web site might simultaneously display two or more ads from different advertisers.

In order to determine the associations between keywords and the placement of particular ads, the online advertising service may require that advertisers bid for keywords. In some cases, the highest bidder wins. In other cases, additional information may be taken into account. For instance, the online advertising service may try to improve the user experience with online ads by selecting ads to associate with a keyword based on a quality score.

In online advertising, a quality score may be a numeric or symbolic representation of the quality and relevance of a keyword based on its associated online ads and their respective landing web pages as determined by an online advertising service. Factors that impact a quality score include, but are not limited to: (i) an ad's past click-through rate, (ii) how relevant the ad's text is to the keyword, (iii) the landing web page's relevance to the keyword, ease of navigation, and loading times, (iv) geographic relevance, and/or (v) how well the ad has performed when viewed on different types of client devices, such as personal computers, tablets, smartphones, etc. Other factors may be used as well as or instead of any of these factors.

In some embodiments, a quality score may be represented as an integer, taking on values from 1 to 10. On this scale, 1 is the lowest possible quality score and 10 is the highest. An online advertising service may determine which ads are displayed, or the order in which ads are displayed, based on a formula that includes the quality score of the ad and its landing web page with respect to the keyword, and the advertiser's bid amount for that keyword. Thus it is advantageous for an advertiser to match ads with appropriate keywords, as well as to design a relevant landing web page that performs well across various types of client devices. Based on these criteria, an advertiser that bids less for a keyword, but has a more relevant ad and a more relevant, better-performing web site may be preferred over an advertiser that bids more for the keyword but has a less relevant ad or a less relevant, poorer-performing web site.

Turning back to FIG. 5A, a demand side platform (DSP) may exist between advertising agency 500 and online advertising services 504. The DSP may be web-based or client-based software that enables various entities to buy ads across multiple online advertising services in an automated or semi-automated fashion. The DSP may perform analytics to establish the value of an ad, and then place a bid accordingly. DSPs may be operated by third parties other than advertising agency 500 or online advertising services 504. Examples of DSPs include those of MediaMath® and Invite Media.

Regardless of how ads are placed, each set of ad copy and associated keywords may be part of a distinct advertising campaign. Some advertising campaigns may include multiple sets of ad copy and associated keywords. In some cases, the same ad copy and/or associated keywords can be used across multiple campaigns and/or multiple advertising accounts. For example, an advertiser may have three main brands, each with its own advertising campaign defined by respective sets of ad copy and associated keywords. However, the advertiser may also advertise its company name, with different ad copy and associated keywords, across all of these brands.

As one or more advertising campaigns are launched and supported in this fashion, advertising agency 500 may determine conversions from online advertising services 504 themselves, as well as traffic tracking services 506. Online advertising services 504 may be able to report the number of impressions and click-throughs for a particular ad or advertising campaign, but might not be able to report leads or revenue for the campaign. Thus, advertising agency 500 may use traffic tracking services 506 for these purposes.

Traffic tracking services 506 may include various types of analytics services that track and record user traffic. These may include web based analytics (e.g., with or without HTML tracking tags), application (or app) based analytics, phone call based analytics, and so on. Examples of traffic tracking services include Google Analytics, Adobe® Analytics, and Invoca® call tracking.

As an example of web based analytics, a traffic tracking service (e.g., service 506A and/or 506B) may allow an advertiser to insert a unique tracking code into one or more of the web pages on the advertiser's web site. This tracking code may be a snippet of JavaScript or some other programming language. The tracking code may be silently executed by the user's web browser when the user browses the page(s). The tracking code may collect information about the user (e.g., Internet Protocol (IP) address, and/or information about the user's web browser or computing device) and send this information to a traffic tracking service device. Additionally, the tracking code may set one or more browser cookies in the user's web browser. These cookies may store information such as whether the visitor has been to the site before, the timestamp of the current visit, and the referrer site or advertising campaign that directed the visitor to the page (e.g., search engine, ad copy, keywords, etc.).

As an example of phone based analytics, an advertiser's various advertising campaigns, keywords, web pages, and so on may each be associated with a telephone number. More than one telephone number may be used so that specific advertising campaigns, keywords, web pages can be identified.

For instance, an advertiser may be running two different advertising campaigns, each with a different telephone number (e.g., "vanity" numbers used only for this purpose). In the ad copy for these campaigns, one of these phone numbers may appear. For instance, the ad copy may suggest that a user call the displayed phone number if they are interested in the product or service being advertised. Each phone number may be a specially assigned number that is only used for receiving calls related to the respective ad. Thus, each incoming phone call to a particular tracked phone number can be counted as a conversion. As an example, a traffic tracking service may provide software on a computer that receives the incoming call, identifies the associated campaign, and records this information, perhaps with the caller's phone number. Then, the software may route the call to an agent who answers the call.

Advertising agency 500 may continuously or repeatedly retrieve, from online advertising services 504 and traffic tracking services 506, information regarding the amount spent on advertising as well as the conversions for each advertising campaign. This information may be presented in various ways on computer-implemented graphical user interfaces 508, some of which are described below. Since the amount spent and the conversions per advertising campaign can change minute to minute (or even more frequently), the advertising agency may continuously, periodically, or from time to time, retrieve updated representations of these values. In some cases, the retrieval may take place every 1, 2, 5, 10, 15, 20, 30 or 60 minutes, once per every one or more hours, or randomly. With this updated information, computer-implemented graphical user interfaces 508 may be revised accordingly to reflect the information.

Continuous retrieval of this information may involve a computing device affiliated with advertising agency 500 retrieving the information from online advertising services 504 and traffic tracking services 506 at a particular time. When that retrieval completes, the computing device may initiate another such retrieval. Alternatively, the computing device may wait a period of time (e.g., a few seconds or minutes) before initiating a subsequent retrieval.

Figure 6:
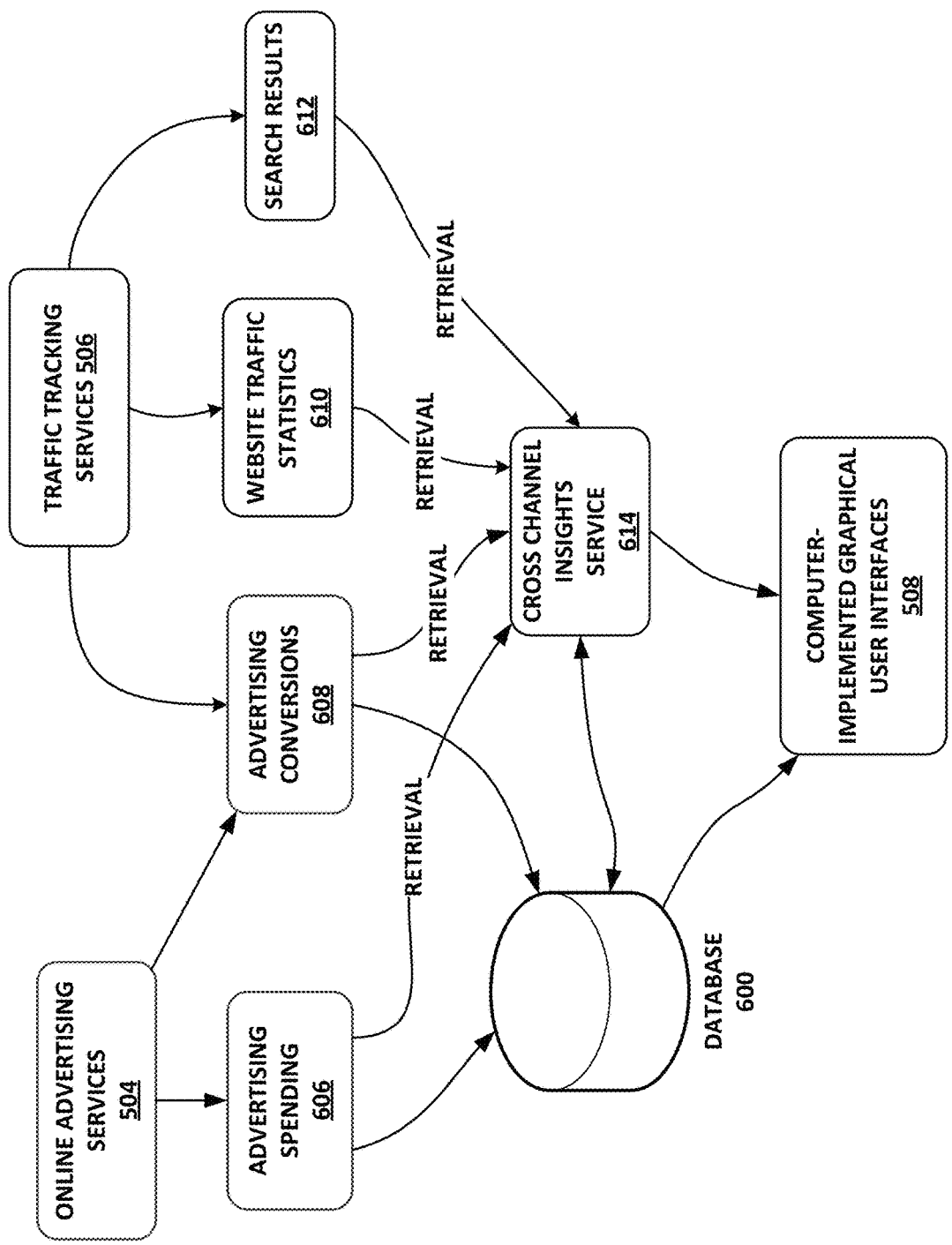
FIG. 6 depicts an architecture for cross channel advertising performance tracking, according to an example embodiment.

FIG. 6 depicts an architecture for cross channel advertising performance tracking, according to an example embodiment. FIG. 6 provides another view of the embodiments discussed in the context of FIGS. 4, 5A, and 5B.

In FIG. 6, online advertising services 504 and traffic tracking services 506 provide advertising spending 606 and advertising conversions 608, each of which may be accessible via respective computing devices. Traffic tracking services 506 also provides website traffic statistics 610 and search results 612. Website traffic statistics 610 and search results 612 may include services that track individual website traffic statistics or search results. Website traffic statistics 610 may include, for one or more websites, information such as total website visits, new website visits, sources of website traffic statistics, and the geographic location of the users accessing the websites. Examples of services that may provide website traffic statistics 610 may include Google Analytics and/or Adobe® Analytics.

Search results 612 may include keyword search data such as the number of links to a particular website on a search results page, the number of times a website is clicked per keyword searched, and the total number of conversions attributed to a particular keyword. An example of a service that may provide search results 612 may include Google Search Console.

Cross channel insights service 614 may be software that operates on another computing device, and may retrieve advertising spending 606, advertising conversions 608, website traffic statistics 610, and search results 612. Cross channel insights service 614 may transmit representations of advertising spending 606, advertising conversions 608, website traffic statistics 610, and search results 612 to database 600. Database 600 may store these representations, as well as previously-received representations of advertising spending 606, advertising conversions 608, website traffic statistics 610, and search results 612. Based on one or more of advertising spending 606, advertising conversions 608, website traffic statistics 610, search results 612, and/or other data as well, database 600 and/or cross channel insights service 614 may generate computer-implemented graphical user interfaces 508 (see FIGS. 8A-8I, for example). Cross channel insights service 614 may operate one or more software applications on a server device exemplified by computing device 200, or on a server cluster exemplified by server cluster 304.

4. Example Paid Search Advertising

Paid search advertising involves an advertiser paying for its ads to appear in search results related to one or more keywords that were entered into a search engine. Payment may alternatively or additionally be triggered each time such an ad is clicked or displayed. An example of search engine advertising is shown in FIG. 7A.

This figure features display 700 that includes text search box 702, paid search results 704, 706, and 708, and ranked search results 710, 712, and 714. Display 700 may be a web-based search engine interface, but other types of search interfaces may be used as well.

Text search box 702 includes a text string ("cell phone repair") that has been entered by way of a client device. This text string may be transmitted to a remote search engine server which then identifies search results related to the text string for display, and transmits these results back to the client device. In the case of display 700, the first three results are paid search results 704, 706, and 708 and the second three results are ranked search results 710, 712, and 714.

Each of paid search results 704, 706, and 708 and ranked search results 710, 712, and 714 provide three lines of text including a description of a business, a URL and phone number of the business, and a brief description of the products and/or services offered. For example, paid search result 706 is for the business "Electrode Shack" that has a web site at the URL www.electrodeshack456.com, has a phone number of 847-555-1212, and offers phone repair starting at $49.99. Further, each of paid search results 704, 706, and 708 is clearly identified as an advertisement by the text "AD" appearing to the left of each of these results.

When identifying search results related to the text string, the search engine server may consider the text string itself, various contexts of the text string, and potentially other factors, such as attributes, characteristics, and/or preferences the client device's user, location of the client device, and so on. For instance, paid search result 706 and ranked search results 710, 712, and 714 each are explicitly related to Chicago-based businesses, and all listed search results are associated with phone numbers with a Chicago area code. This may be due to the client device being in the vicinity of Chicago.

In any event, paid search results 704, 706, and 708 may be selected based on their respective advertisers bidding on one or more of the keywords in or related to the text string "cell phone repair" and possibly quality scores associated with these bids. The ordering of paid search results, in which paid search result 704 is displayed higher than paid search result 706, and paid search result 706 is displayed higher than paid search result 708, may also be due to the relationship between the text string and the bid-upon keywords, as well as the quality scores. For instance, the search engine may have selected paid search result 704 to be placed highest in display 700 because the bid for paid search result 704 included the text string "cell phone repair" and was associated with the highest quality score of all bidders. Ranked search results 710 may be selected and ordered based on their relevance to the text string "cell phone repair," other factors related to the client device and user of the client device (e.g., location), as well as quality scores associated with the referenced web sites.

Display 700 may also include graphical ads, banner ads, sidebars ads, and other types of information. The representation in FIG. 7A is merely for purpose of example and is not limiting.

5. Example Display Advertising

Display advertising is primarily focused on ads that are displayed on web sites. Such ads may include text, images, overlays, interstitials, animations, audio, and video. An example of display advertising is shown in FIG. 7B.

In this figure, a web page 716 is shown. However, the contents of web page 716 could be displayed on other media, such as within an application. Web page 716 includes banner ad 718, article headline 720, sidebar ad 722, and article text 724.

Article headline 720 and article text 724 may be provided by the operator or author of web page 716. The web page may be an organization's webpage, a personal web page, a social networking web page, a blog, and so on. Article headline 720 and article text 724 may contain information related to the operator or author.

Banner ad 718 and sidebar ad 722 may be ads selected by an online advertising service for display on web page 716. For instance, web page 716 may include an extent of JavaScript code for each of banner ad 718 and sidebar ad 722, where the code includes a link to the online advertising service. When web page 716 is loaded by a client device, the code instructs the client device to execute a remote operation defined by the link, and the remote operation may trigger the selection of an ad.

As an example, JavaScript code that can be embedded in a web page is shown below. The lines of this piece of code are numbered for purpose of convenience.

```
1 <script type="text/javascript">
2 ad_client = "pub-6044026340890176";
3 ad_slot = "3105157606";
4 ad_width = 468;
5 ad_height = 60;
6 src="http://www.example.com/pagead/show_ads.js">
7 </script>
```

Lines 1 and 7 define a block indicating that the content therein is JavaScript. Lines 2-5 define the type of ad to be displayed. Line 2 specifies the publisher of the ad (e.g., the operator of the web site). Line 3 specifies a slot, or context, for the ad. Each web page for a particular publisher may have a different slot in order to allow different types of ads to be displayed on the same web site. Lines 4 and 5 specify the width and height, respectively, of the ad to be displayed. Line 6 specifies a URL of an online advertising service, the URL containing further code that, when accessed, selects an ad in accordance with the parameters specified in lines 2-5.

Thus, when web page 716 is loaded into a client device, the client device may display a representation of web page 716 in accordance with FIG. 7B. This may involve the client device retrieving relevant and/or context-sensitive ad copy to place in banner ad 718 and sidebar ad 722. Nonetheless, other types of ads and ad placements are possible, and FIG. 7B is merely for purpose of example.

6. Example SEO Information

SEO involves an advertiser implementing website and URL modifications in order to naturally appear higher in online search results. Higher visibility in search results can be achieved by using linking, keywords, and particular URL formats.

An advertiser may operate a website and the advertiser may be interested in increasing visits to the website that ultimately result in sales of a particular product. Turning to FIG. 6, the advertiser may use tracking services 506 in order to analyze the website traffic statistics 610, and search results 612 of the website. Cross channel insights service 614 may receive the information from website traffic statistics 610 and search results 612 and output them to computer-implemented graphic user interfaces 508. These graphic user interfaces 508 may allow an advertiser to quickly ascertain website performance based on a variety of metrics. Some of these metrics may include total website visits, conversions, revenue, and impressions. Other metrics may be possible.

SEO impressions may be the number of links to a website that are requested for display and sent to a search results page. SEO conversions may be the number of conversions attributed to the search result keyword. SEO website visits may be the total number of times a page has been visited by users. SEO revenue may be the total revenue generated by the website.

For instance, suppose an advertiser operates a website that sells bananas. When a user searches for "bananas" on a search engine, the advertiser's website may be displayed as one of a number of websites that sell bananas. When the advertiser's website is requested for display as a search result, an impression is registered. If the user clicks on the advertiser's website on the search results page, a conversion is registered for the keyword "bananas." Website visits may be the total number of times users land on the advertiser's webpage independent of whether the user searched for "bananas." Revenue may be the total revenue generated by the advertiser's web site.

Based on the website performance, an advertiser may choose to make changes to the website to increase website visibility. Examples of website changes may include increasing the number of inbound links to the website to increase cross traffic between sites, increasing the number of relevant keywords on the website, and adjusting the URL structure of the website. An example of increasing inbound links may include increasing the contextual relevance of the website as to provide higher value for another website to link to the website. For instance, an advertiser may increase the amount a particular keyword is displayed on the website. In another example, an advertiser may include relevant keywords in the text of articles on the webpage or in the titles of those articles. The addition of these keywords may raise the contextual relevancy of the website and may increase the number of links to the website. Other examples of increasing inbound links exist.

Additionally, the advertiser may make changes to the number of relevant keywords to the website. This may include adding new keywords to the website or changing existing keywords to keywords that are more often searched for. For instance, if a particular website relates to automobile news, an advertiser may increase the frequency that the term "automobile" appears on the website. Alternatively, an advertiser may add other terms that relate to "automobile" on the website, such as "car," "station wagon," "sports utility vehicle (SUV)," and others. The addition of these terms may increase the relevancy of the website to "automobiles" in search engine rankings.

Further, the advertiser may decide to adjust the URL structure of the website in order to increase search result rankings. For instance, a normal URL may appear like this: http://www.website.com/john-doe. The website URL may be broken down into categories, sub-categories, and pages. The category may include "about website," the sub-category may include "meet-the-team," and the page may include "John Doe." The website may also contain URLs for each of ten employees. Each of these categories, sub-categories, and pages may have separate values for the metrics discussed above. For example, if a user searches for "John Doe" on a search engine, and the URL "http://www.website.com/john-doe" is requested for display, an impression will register for the separate elements "about website," "meet-the-team," and "John Doe." Further, if the user clicks on the URL, a conversion will be attributed to each of the elements "about website," "meet-the-team," and "John Doe." However, if the user searched for another employee, an impression may be registered for the elements "about website" and "meet-the-team," but not be registered for "John Doe."

After receiving website traffic statistics 610 and search results 612, cross channel insights service 614 may provide the information on a category, sub-category, and/or page level. This information may provide an advertiser the ability to see how the website is performing on a per URL basis and, if necessary, adjust certain aspects of the website in order to increase organic website traffic.

7. Example Advertising Metrics

It is desirable to be able to determine and/or quantify the success of an advertising campaign. This success, however, can be measured in different ways for different campaigns. For instance, in some campaigns, the number of impressions might be the most relevant metric. In other campaigns, conversions might be more important than impressions. For many campaigns, the cost of the campaign, perhaps in units of currency per time period (e.g., dollars per day) is an important factor.

Given this disparity, it is beneficial for the graphical user interfaces disclosed herein to be able to support a wide variety of metrics with which advertising can be evaluated. This section contains descriptions of some such metrics. Nonetheless, other metrics may be used with any of the embodiments herein.

Most of the metrics discussed below can be provided (1) per a particular keyword, (2) per a group of two or more keywords, (3) per a particular channel, (4) per a particular advertising campaign, (5) per a group of two or more advertising campaigns, (6) per a particular piece of ad copy, (7) per multiple pieces of ad copy, or (8) per any one or more of these metrics. For purpose of discussion, an "item of interest" can refer to any of the eight categories above, or other categories related to online advertising. Each metric may be determined over a particular period of time (e.g., an hour, day, week, month, custom period of time, etc.).

As an example, an item of interest may be all ads that are associated with a particular set of keywords and displayed as part of a particular advertising campaign over the course of a particular week. As another example, an item of interest may be a single ad (i.e., a particular piece of ad copy) displayed across multiple advertising campaigns during the previous month. Additional examples exist.

Further, these metrics can be divided into several logical categories including: performance, cost, conversions, revenue, and attribution. Other categories are possible.

A. Performance

Performance relates to how well an item of interest is being exposed to users.

| Metric | Description |
| --- | --- |
| Impressions | Related to the number of times that an item of interest was requested by a device and sent to that device. For instance, impressions may represent the number of ads requested by a device and sent to that device for a particular keyword or keywords, and/or the number of displayed ads for a particular campaign or campaigns. |
| Clicks | Related to the number of times that an item of interest was clicked on, selected, or otherwise accessed. Clicks are expected to be no more than the number of impressions for the same item of interest over the same time period. |
| Click-Through Rate (CTR) | CTR may represent a ratio of clicks to impressions for an item of interest. For instance, if an ad had 1000 impressions and 7 clicks in a time period, the CTR is 7/1000 or 0.7%. |

B. Cost

Cost is related to expenses of advertising accrued by the advertiser from displayed ads.

| Metric | Description |
| --- | --- |
| Media Cost | Related to the total cost to the advertiser of all activities (e.g., impressions, clicks, etc.) on an item of interest. |
| CPM | Related to the cost to the advertiser for every 1000 impressions of an item of interest. |
| Cost Per Action (CPA) | Related to the average cost to the advertiser for each type of conversion (e.g., impressions, clicks, and/or other activities) for an item of interest. |

C. Conversions

As noted above, conversions relate to the number of times that a user has engaged in an activity that the advertiser deems to be valuable. Conversions may include impressions, clicks-throughs, viewing video or other multimedia content, downloads, phone calls, purchases, and so on.

| Metric | Description |
| --- | --- |
| Click-Through Conversions | Related to the number of times that users have performed any of one or more pre-defined activities after clicking through an item of interest. |
| View-Through Conversions | Related to the number of times that users have performed any of one or more pre-defined activities after viewing an item of interest, but not clicking through it. For example, viewing a video advertisement for a product then purchasing that product may be counted as a view-through conversion. |
| Total Conversions | Related to the sum of click-through conversions, view-through conversions, and any other type of supported conversions. |
| Total Adjusted Conversions | Related to the Total Conversions as adjusted by preferred attribution rates for different types of conversions. For example, an advertiser may want to give 10% credit for view-through conversions. Thus, if an ad registered three click-through conversions and ten view-through conversions, the total adjusted conversions would be four. |
| Conversion Rate | Related to an average number of conversions per click on an item of interest. This value may be a percentage. For instance, if there were 1000 clicks during a time period, 30 of which led to conversions, then the conversion rate for this time period would be 3%. This value may also be calculated using impressions. For example, if there were 1000 impressions during a time period, 15 of which led to conversions, then the conversion rate for this time period would be 1.5%. |

D. Revenue

Revenue is related to the income to the advertiser that can be attributed to advertising.

| Metric | Description |
| --- | --- |
| Click-Through Revenue | Related to the revenue to the advertiser due to users clicking through an item of interest. |
| View-Through Revenue | Related to the total revenue to the advertiser, due to users viewing an item of interest, but not clicking through it. |
| Total Revenue | Related to the sum of click-through revenue, view-through revenue, and any other type of revenue. |
| Return on Advertising Spend (ROAS) | Related to revenue from conversions attributable to advertising for an item of interest divided by the amount the advertiser spent on that advertising. |
| Average Order Value (AOV) | Related to the total revenue to the advertiser for an item of interest divided by the number of conversions that resulted in the revenue. |
| Revenue Per Click (RPC) | Related to the total revenue to the advertiser for an item of interest divided by the number of user clicks on the item of interest that led to this revenue. |

E. Attribution

Attribution is related to the weight of contribution for each channel assisting in a conversion. For instance, sometimes a potential customer may see an advertisement through an impression via paid search several times before clicking on the advertisement via display advertising and ultimately purchasing a product. Attribution may allow an advertiser to "drill down" and see the breakdown of each channel and how it helped result in a conversion. Attribution may consist of last-click, first-click, or weighted attribution. Last-click attribution would give the full conversion credit to the channel that was last-clicked by the potential customer. First-click attribution would give the full conversion credit to the channel that was first-clicked by the potential customer. Weighted attribution would assign each contributing channel a fraction based on its level of impact in causing the conversion. Additional methods of attribution exist.

8. Example Graphical User Interfaces

FIGS. 8A-8I depict graphical user interfaces, in accordance with example embodiments. Each of these graphical user interfaces may be provided for display on a client device. The information provided therein may be derived, at least in part, from data stored in a database, such as database 600. Nonetheless, these graphical user interfaces are merely for purpose of illustration. The embodiments described herein may provide graphical user interfaces that format information differently, include more or less information, include different types of information, and relate to one another in different ways.

One of the difficulties that advertisers and advertising agencies encounter is that it is challenging to be able to measure the performance of online advertising campaigns at both a high level and low level. While these entities can track advertising spend and conversions, for example, on a weekly or monthly basis, it is hard to know how much spending on which keywords, on what days, are actually resulting in conversions. Additionally, advertising performance might vary based on the type of device used to view an ad, as well as the online advertising service that provides the ad.

As described above, data can be collected for many of the metrics discussed in the previous section. But, an advertiser or advertising agency may be simultaneously managing hundreds or thousands (or even more) advertising campaigns. Thus, the amount of data may be overwhelming. As a consequence, technical tools are required to be able to filter and process this data so that it can be presented in a manageable fashion on one or more configurable graphical user interfaces. Doing so may provide insights into the efficacy of online advertising performance that would otherwise be unavailable.

As just one example, suppose that an advertiser is running a multichannel advertising campaign with one piece of ad copy. With the embodiments herein, the advertiser would be able to determine which of these two channels results in higher conversions or a lower cost per conversion for each ad. Further, if the ad exhibits a drop in conversions from week to week across one channel but not another, the embodiments herein may be able to help the advertiser determine on which day or days the drop occurred, and why the drop occurred in one channel but not another. For instance, the advertiser might determine that the paid search model is performing better than a display advertising model for a certain ad. In response to making these observations, the advertiser may take measures to increase the ad's quality score so that the ad's conversions are likely to increase in the underperforming channel. In some cases, this may involve improving the quality of a landing page associated with the ad, increasing the bidding budget for the ad, or designing more relevant ad copy. The advertiser may also take measures to increase the allocation of funds towards the particular channel that is performing well and reduce the funds allocated towards the underperforming channel. The computerized embodiments herein may suggest one or more of these approaches based on the data collected for the ad.

In another example, an advertiser may be running a multichannel advertising campaign for which certain keywords are performing well in terms of ROAS. But, with the embodiments herein, the advertiser will also be able to rapidly determine the impressions of ads related to these keywords across multiple channels. If the impressions are deemed to be low across one channel, then the advertiser would know that additional impressions can be achieved by, for instance, improving ad content or increasing the bid amount for the keywords in that underperforming channel.

Notably, the embodiments herein require computer implementation. By its very nature, online advertising is premised on the existence of computers and computer networks. Billions of people around the world, accessing the Internet or private networks in various ways, may be served ads. Tracking the performance of these ads, such as the associated number of impressions, clicks, and conversions, occurs on computers that are connected via networks.

Further, there are no non-computerized analogies for such activities. For instance, there is no way to accurately determine how many people have viewed an ad in a print newspaper, much less reliably determine whether a viewing of that ad resulted in a conversion. Thus, the solutions presented herein a specifically designed to solve technical problems related to online advertising.

Moreover, these solutions may take the form of graphical user interfaces that present information that is filtered and organized so that an advertiser or advertising agency can rapidly determine the status of a large number of online advertising campaigns. These graphical user interfaces automatically provide intuitive and insightful reports that would not be possible to obtain for traditional methods of advertising.

For instance, an advertiser can determine, by way of the graphical user interfaces described herein, the current allocation of advertising funds across multiple channels, brands and advertising campaigns. Given that these funds are typically limited, the advertiser may re-allocate the funds on a weekly, daily, or even hourly basis. For instance, the advertiser may move funds from high-performing campaigns to low-performing campaigns, from one set of keywords to another set of keywords, or from one channel to another channel. In the past, the information to make such a decision was not available, or if it was, collating that information would take such a long time that the advertiser could not respond to optimization opportunities in real time.

As an example, on the morning of one particular day, an advertiser might notice that a critical advertising campaign is registering fewer impressions and revenue than it had on previous days. After some investigation, the advertiser may conclude that this is due to competitors outbidding the advertiser for certain keywords. In response, the advertiser can immediately increase its own bids for these keywords (e.g., by reallocating funds from less important campaigns), and by afternoon of the same day, the advertiser may be able to confirm that the campaign is once again performing as expected. This sort of real time responsiveness would not be possible in traditional advertising.

Non-limiting examples of such graphical user interfaces are described below. Nonetheless, these examples are made for purpose of illustration, and other graphical user interfaces, and layouts of information therein, may be possible.

Figure 8A:
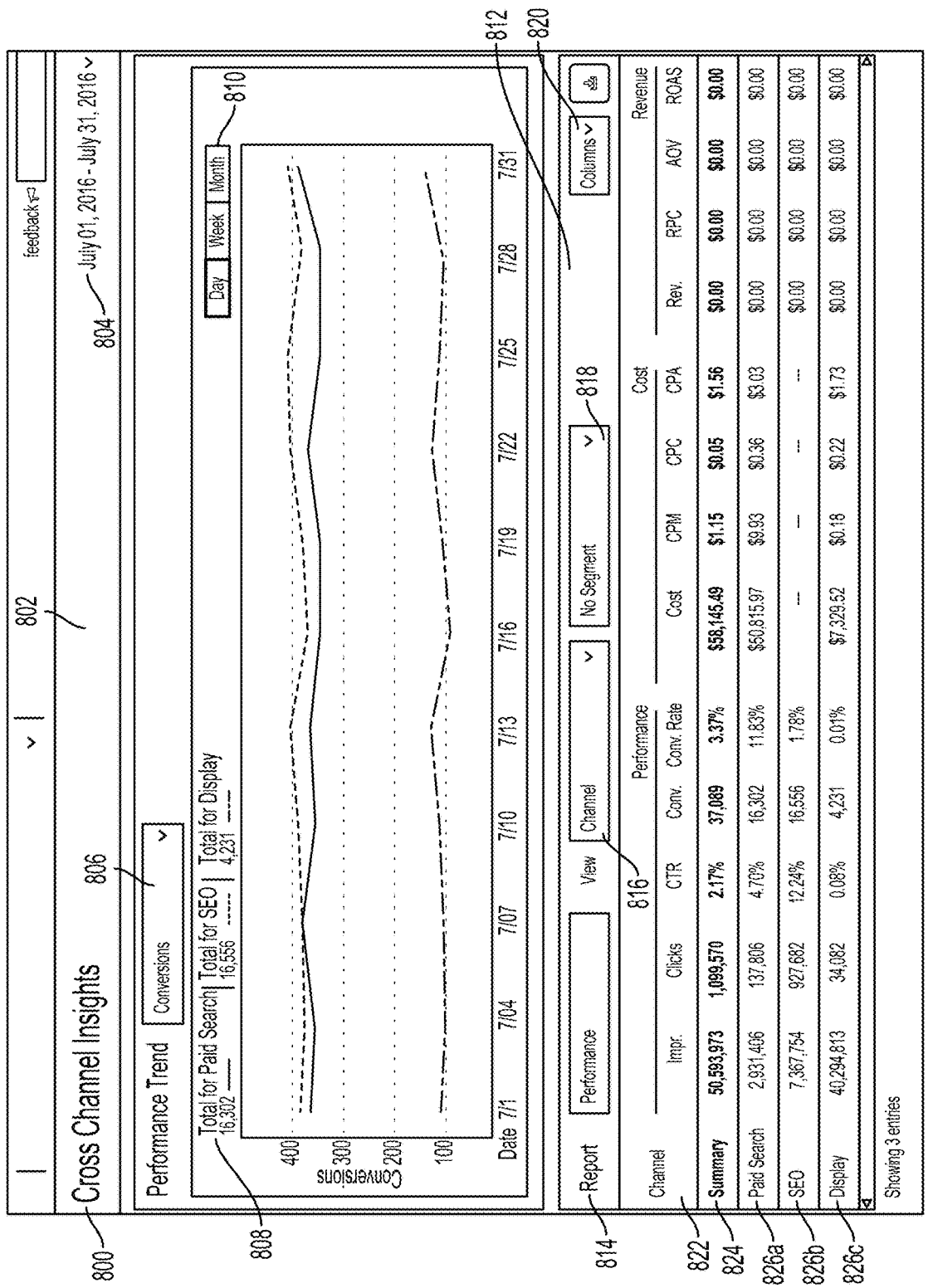
FIG. 8A depicts a cross channel insights graphical user interface, according to an example embodiment.

FIG. 8A depicts a cross channel insights graphical user interface 800. Graphical user interface 800 includes chart 808 above table 812. Both chart 808 and table 812 provide insight into the performance of channels for a particular client or entity. In subsequent figures, variations of chart 808 and table 812 are depicted separately for purpose of simplicity. However, any combination of a chart and a table can be combined into a single graphical user interface, in the fashion depicted in FIG. 8A or differently. In some embodiments, the information displayed on chart 808 and table 812 may be related, e.g., such that use of a control on one of chart 808 or table 812 impacts the information displayed in both.

As an example, if the advertiser operates controls (e.g., control 816 and control 818) to display information in the table at the trend of week level sorted by channel, the chart may automatically update to plot the associated trend of week data for each channel. Further, if the advertiser operates control 816 to display information in the table by channel, the chart may automatically update to plot the total ad data for each channel.

Graphical user interface 800 includes a header section that provides an entity selector 802, and date range selector 804. Also, chart 808 includes metric selector 806 and chart granularity selector 810. In various embodiments other information may be displayed on or omitted from a chart of graphical user interface 800, and the displayed information can be arranged differently than depicted in FIG. 8A. For instance, in FIGS. 8B-8I, different example displays of such information are provided.

Table 812 includes a report type selector 814, view selector 816, view modifier 818, a column selector 820, table header row 822, table summary row 824, and table entry rows 826a, 826b, and 826c. These entries in table entry rows 826a, 826b, and 826c may relate to the various channels of advertising. For instance, table entry row 826a may relate to paid search advertising metrics. Additionally, table row entry 826b may relate to display advertising metrics and table row entry 826c may relate to SEO information metrics.

In various embodiments other information may be displayed on or omitted from a table of graphical user interface 800, and the displayed information can be arranged differently than depicted in FIG. 8A. For instance, in FIGS. 8I-8J, different example displays of such information are provided.

Entity selector 802, date range selector 804, metric selector 806, chart granularity selector 810, report type selector 814, view selector 816, view modifier 818, and column selector 820 may be referred to herein as "controls." These controls allow the advertiser to modify what is being displayed on graphical user interface 800. For instance, by changing the selection of one or more of these controls, the advertiser's client device may request, and a server device (e.g., a device providing cross channel insights service 614) may retrieve information from database 600 to fulfill the request.

In this manner, the advertiser remotely controls the server devices operating cross channel insights service 614 and database 600, while a server device operating cross channel insights service 614 remotely controls the advertiser's client device. As an example of the latter, the server device may transmit data and instructions to the client device that cause the client device to plot the data in chart 808 and to organize the data in table 812.

The following subsections provide non-limiting descriptions of the components of graphical user interface 800.

A. Entity

Entity selector 802 may be a drop down menu or another type of control that allows an advertiser to select a particular entity (e.g., a client, a business, etc.). Once selected, information relating to the display advertising performance of that particular entity may be displayed in chart 808 and table 812. In FIG. 8A, entity selector 802 is shown but no client is available for selection.

B. Metrics

Metric selector 806 may be a drop down menu or other type of control that allows an advertiser to select a metric related to display advertising. In the embodiment depicted in FIG. 8A, metric selector 806 controls the metric used for the y-axis of chart 808. For instance, metric selector 806 depicts the metric conversions as selected, and conversions are the units used for the y-axis of chart 808. Other possibilities exist.

Metric selector 806 may display any metric discussed herein, including those described in the previous section. These may include any metric discussed in the subsections directed to performance, cost, conversions, revenue, and so on. Other metrics are possible.

Figure 8B:
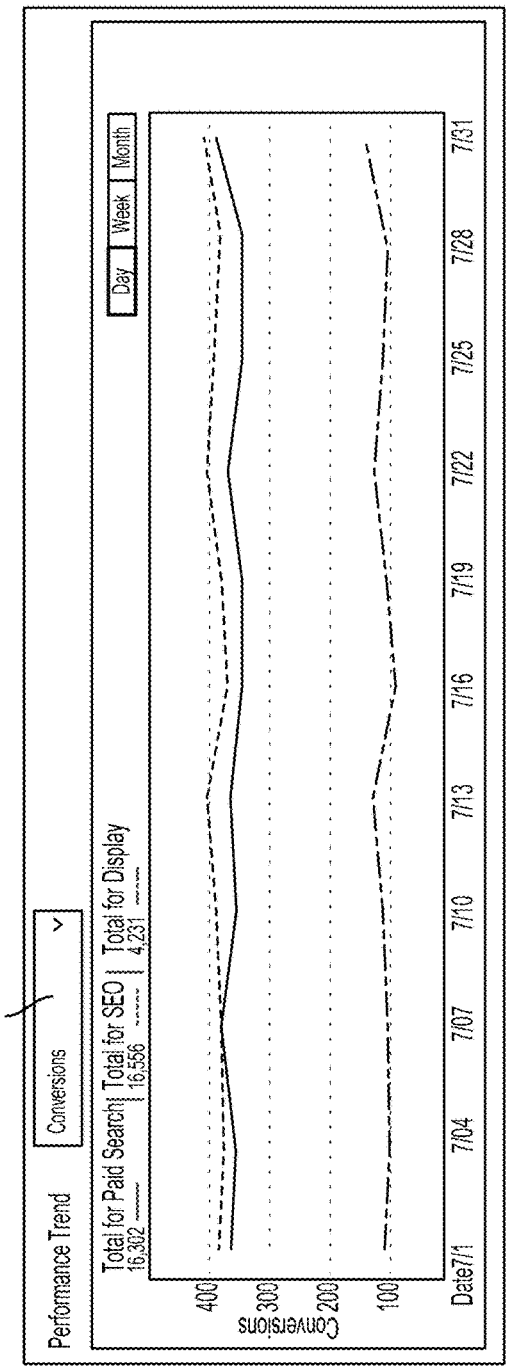
FIG. 8B depicts a cross channel insights graphical user interface, according to an example embodiment.

FIG. 8B displays a drop down menu 806*a* capable of showing a list of selectable metrics for metric selector 806. Conversions is shown as selected, while other metrics are not shown but available for selection. These metrics may include impressions, CTR, and media cost, along with others.

Figure 8C:
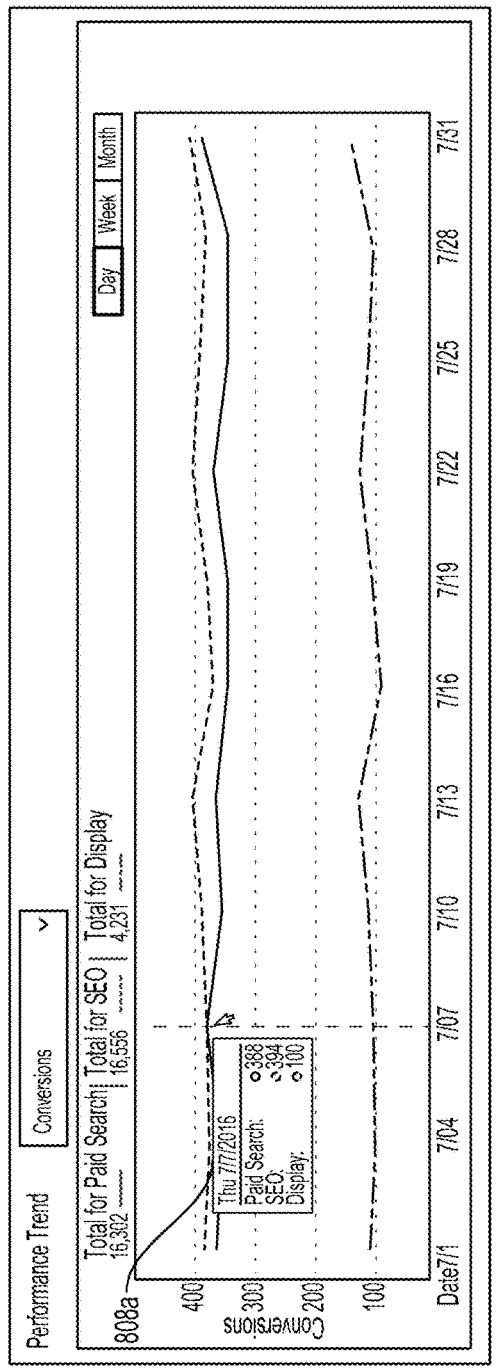
FIG. 8C depicts a cross channel insights graphical user interface, according to an example embodiment.

FIG. 8C is identical to FIG. 8B, except FIG. 8C also displays graphical output 808*a*. Graphical output 808*a* may be displayed when an advertiser hovers over a point on chart 808 with a cursor. Graphical output 808*a* as shown displays the number of conversions for the three channels "paid search," "display," and "SEO." This allows an advertiser to easily see how each channel is performing based on the selected metric and, if necessary, rapidly allocate funds from one channel to another.

C. Date Range

Date range selector 804 may allow an advertiser to specify a range of dates for which information is to be displayed on chart 808 and table 812. In FIGS. 8A-8E, this range of dates is Jul. 1, 2016 to Jul. 31, 2016, and is used to determine the x-axis of chart 808.

To select a date range, an advertiser might, for instance, specify a starting date and an ending date. In some embodiments, a default date range, such as month-to-date range may be provided. Regardless, upon selection of a date range, display advertising performance data might only be displayed for time periods within the selected date range.

FIG. 8A depicts a date range selector 804 capable of showing a list of selectable date ranges. The date range selections that are not shown, but available for selection, include "yesterday," "week to date," "last week," "last 7 days," "last 14 days," "last 30 days," "last month," "this month," "quarter to date," "last quarter," "year to date," "last 12 months," rolling 13 months," and "custom" are available for selection. Other options may be available for selection.

D. Chart

Chart 808 may be a chart or graph comparing the performance across all channels according to the metric selected using metric selector 806. One possible implementation is shown in FIG. 8A where chart 808 is a graph. The x-axis of this graph represents the days of the date range selected by date range selector 804. The y-axis represents conversions, as determined by metric selector 806.

Turning to FIG. 8A, the conversions for each channel are plotted on chart 808. The top line in chart 808 displays conversions for the SEO channel. Additionally, the middle line in chart 808 displays conversions for the paid search channel and the bottom line in chart 808 displays conversions for the display channel. Overall, chart 808 indicates that organic website traffic through SEO is resulting in a greater number of conversions than paid advertising (i.e., paid search and display advertising). Based on chart 808 as shown, an advertiser may decide to allocate additional funds to paid search or display advertising in order to increase the amount of conversions. Chart 808 provides the advertiser with a "big picture" view of the various channels of advertising and their performance based on any metric selected by metric selector 806.

E. Chart Granularity

Figure 8D:
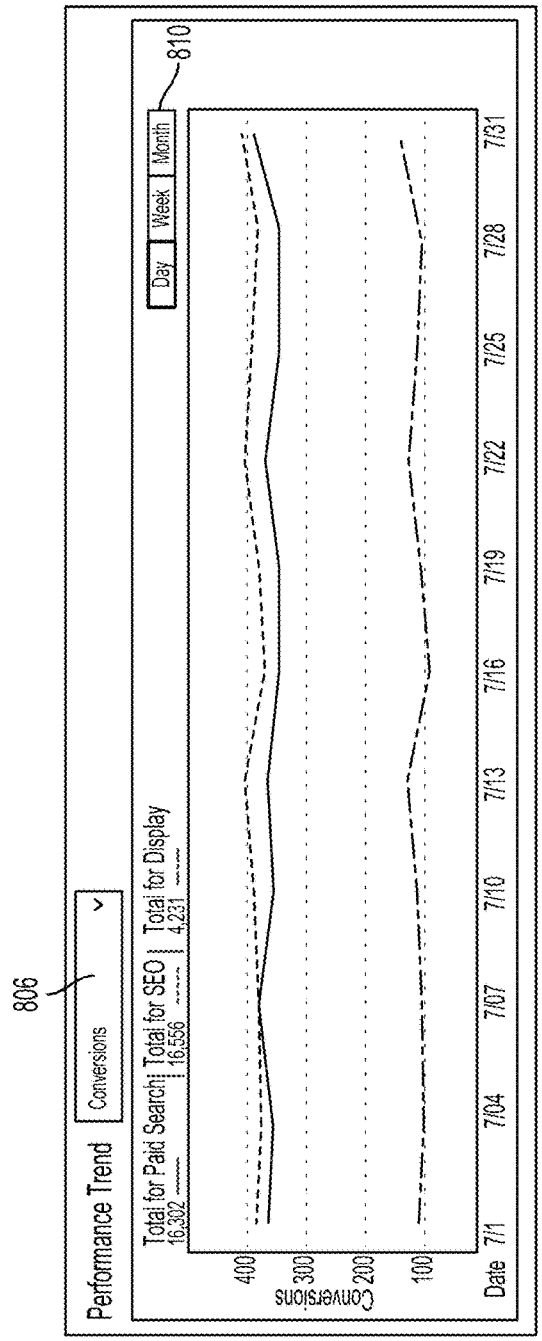
FIG. 8D depicts a cross channel insights graphical user interface, according to an example embodiment.

Chart granularity selector 810 may allow an advertiser to select the amount of time represented by each point on the x-axis of chart 808. For instance, FIG. 8D shows each such point representing one day. However, a chart granularity of a week or month may be selected instead.

Figure 8E:
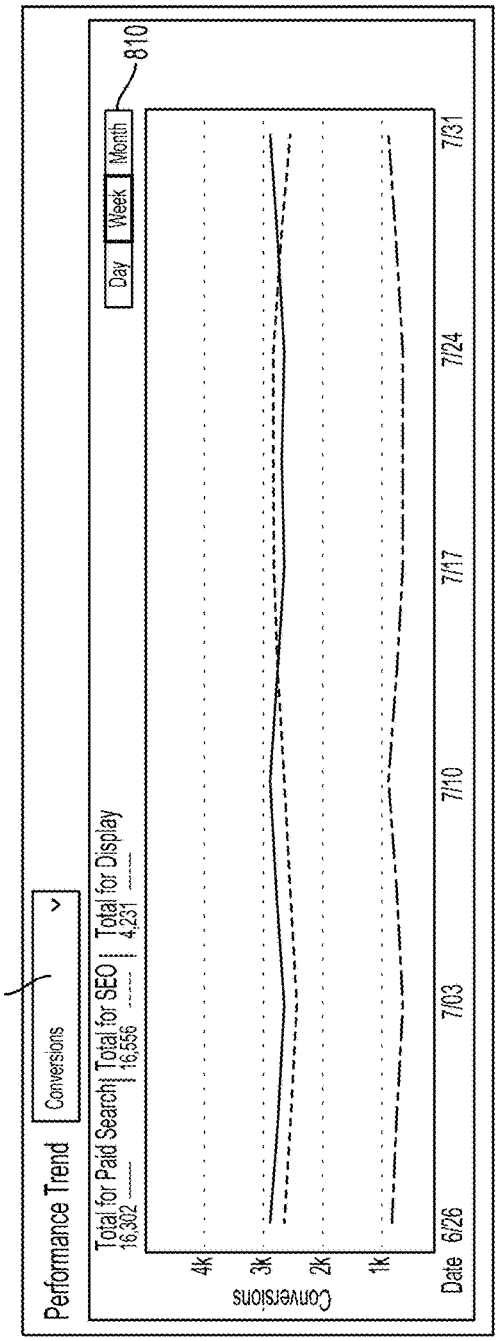
FIG. 8E depicts a cross channel insights graphical user interface, according to an example embodiment.

For instance, FIG. 8E shows a chart granularity of one week. When week is selected using chart granularity selector 810, each point on the x-axis may represent a week from the first week of the current month until the current week (or until the week before the current week). Alternatively, a particular number of weeks may be displayed, such as the most recent 4 weeks. Weeks may be defined to start on Sunday, Monday, or any other day of the week. Further, weeks may be defined to have more or fewer than seven days.

While not shown, when month is selected using chart granularity selector 810, each point on the x-axis may represent a month from the first month of the current year until the current month (or until the month before the current month). Alternatively, a particular number of months may be displayed, such as the most recent 12 months. Any of these ranges may be further limited by the availability of data for the requested time period.

F. Table

Table 812 displays a number of columns and rows. Each column may represent either a way in which multichannel advertising can be categorized or identified, or may represent advertising performance data. As shown in FIG. 8A, the leftmost column depicts channels, while the remaining columns each display values related to a metric. Any metric discussed in the previous section may be displayed in a column.

G. Table Rows

In FIG. 8A, table header row 822 may represent column headers for each column displayed in table 812. Table summary row 824 may represent a total, weighted total, or weighted average of the values represented in the following rows of the table. For instance, the entry of table summary row 824 for the impressions ("Impr.") column includes a sum of ad impressions occurring during the time period selected using date range selector 804. Similarly, the entry of table summary row 824 for the CTR column is the CTR for ads over the same time frame.

Table entry rows 826a, 826b, and 826c may represent entries for each column in the table. For instance, in the summary column, table entry row 826a relates to paid search advertising metrics. Similarly, table entry row 826b relates to SEO metrics, and table entry row 826c relates to display advertising metrics.

H. Report Type

Turning to FIG. 8F, report type selector 814 may be a drop down menu or another type of control that allows an advertiser to select a particular predefined report for display in table 812. The selected report type may determine, to some extent, the columns displayed in table 812. The report type shown is a performance report. Although not shown, other report types may also be available.

When a performance report is selected using report type selector 814 as shown in FIG. 8A, the report may include columns that display the overall performance of each channel across a variety of metrics. This would assist an advertiser identify how each paid channel is performing compared to organic website traffic through SEO.

I. Views

Turning to FIG. 8G, view selector 816 and view modifier 818 may be drop down menus or other types of controls that allow an advertiser to select a particular set of columns for display in table 812. As shown in FIG. 8G, view selector 816 may include the selections "channel," "trend of week," or "trend of month." As shown, view modifier 818 may include the selections "no segment" or "by channel." Other possibilities may exist. Selecting a particular view using view selector 816 may automatically change the selection in view modifier 818. For instance, when trend of week view is selected using view selector 816, view modifier 818 is automatically set to the "by channel" modifier. Other combinations and possibilities may exist. View selector may include at least some of the following selections.

In FIGS. 8A and 8F, when an advertiser selects channel view using view selector 816, table 812 displays a column for each metric discussed in the previous section. When an advertiser selects channel view using view selector 816, the graphical user interface automatically sets view modifier 818 to "no segment."

Turning to FIG. 8H, when an advertiser selects trend of week view using view selector 816, table 812 to displays additional sets of rows for each week corresponding to the date range selected using date range selector 804. As shown, table 812 will display a row for each channel corresponding to a week within the selected date range. When trend of week view is selected, view modifier 818 is automatically set to "by channel." FIG. 8I provides an example of the trend of week view.

FIG. 8F depicts the trend of month view within view selector 816. Although not shown, trend of month view may cause table 812 to display additional sets of rows for each month corresponding to the date range selected in date range selector 804. When trend of month view is selected, table 812 will display a row for each channel corresponding to a month within the selected date range.

J. Column Selector

Column selector 820 may be a drop down menu or another type of control that allows an advertiser to select individual columns to display in table 812. Some or all of the columns that appear in this table each may be associated with a metric described in the previous section. The metrics may include "impressions," "clicks," "CTR," "conversions," "conversion rate," "cost," "CPM," "CPC," "CPA," "revenue," "RPC," "AOV" "ROAS," and so on. When in the form of a drop down menu, the control may display a scrollable list of columns with a checkbox next to each. Columns with a checked checkbox may be displayed, and columns without a checked checkbox might not be displayed. The advertiser may be able to check and uncheck these boxes, thus adding columns to and removing columns from table 812. FIG. 8I provides an example of column selector 820.

9. Example Operations

Figure 9:
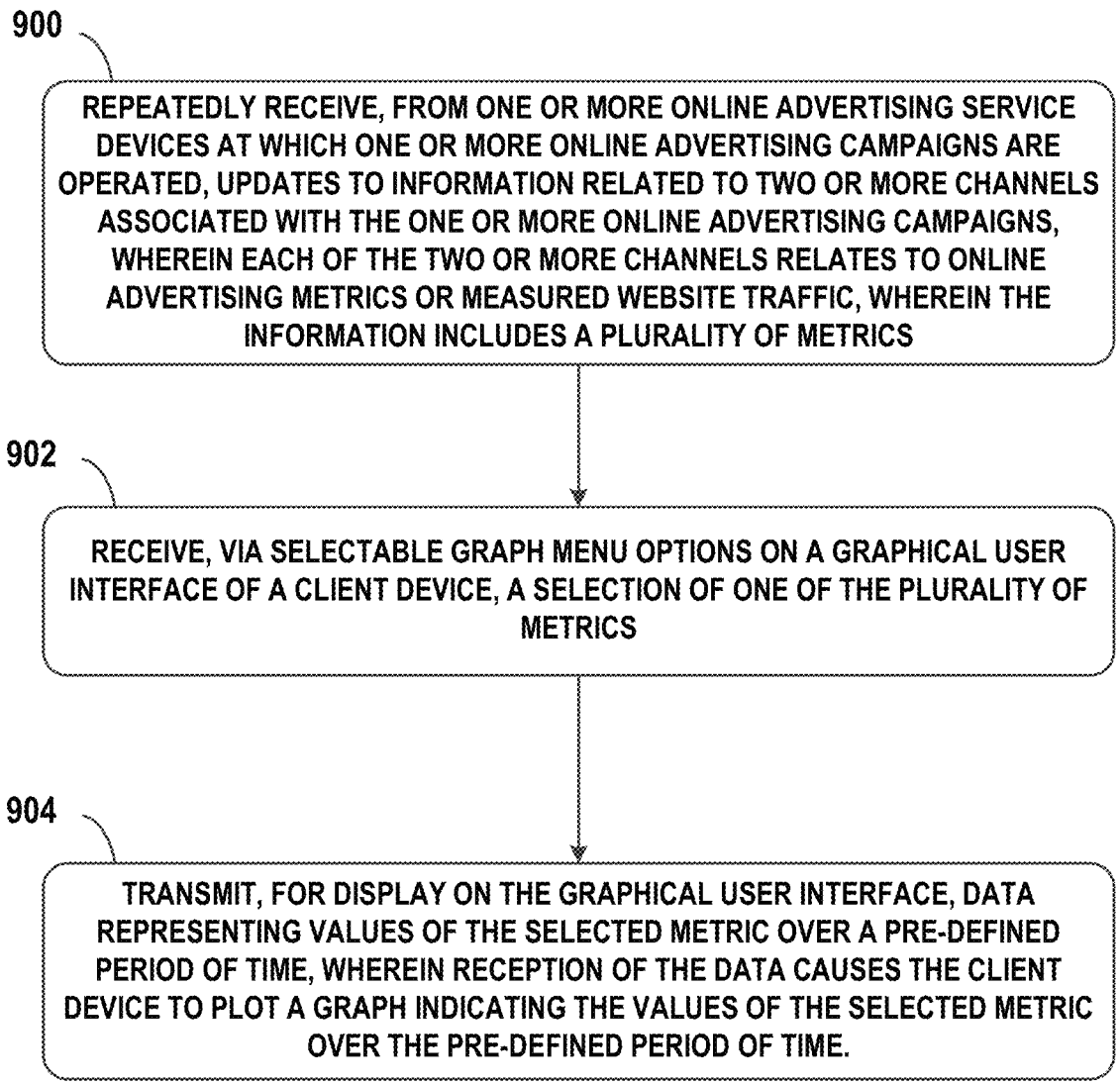
FIG. 9 depicts a flowchart, according to an example embodiment.
Figure 10:
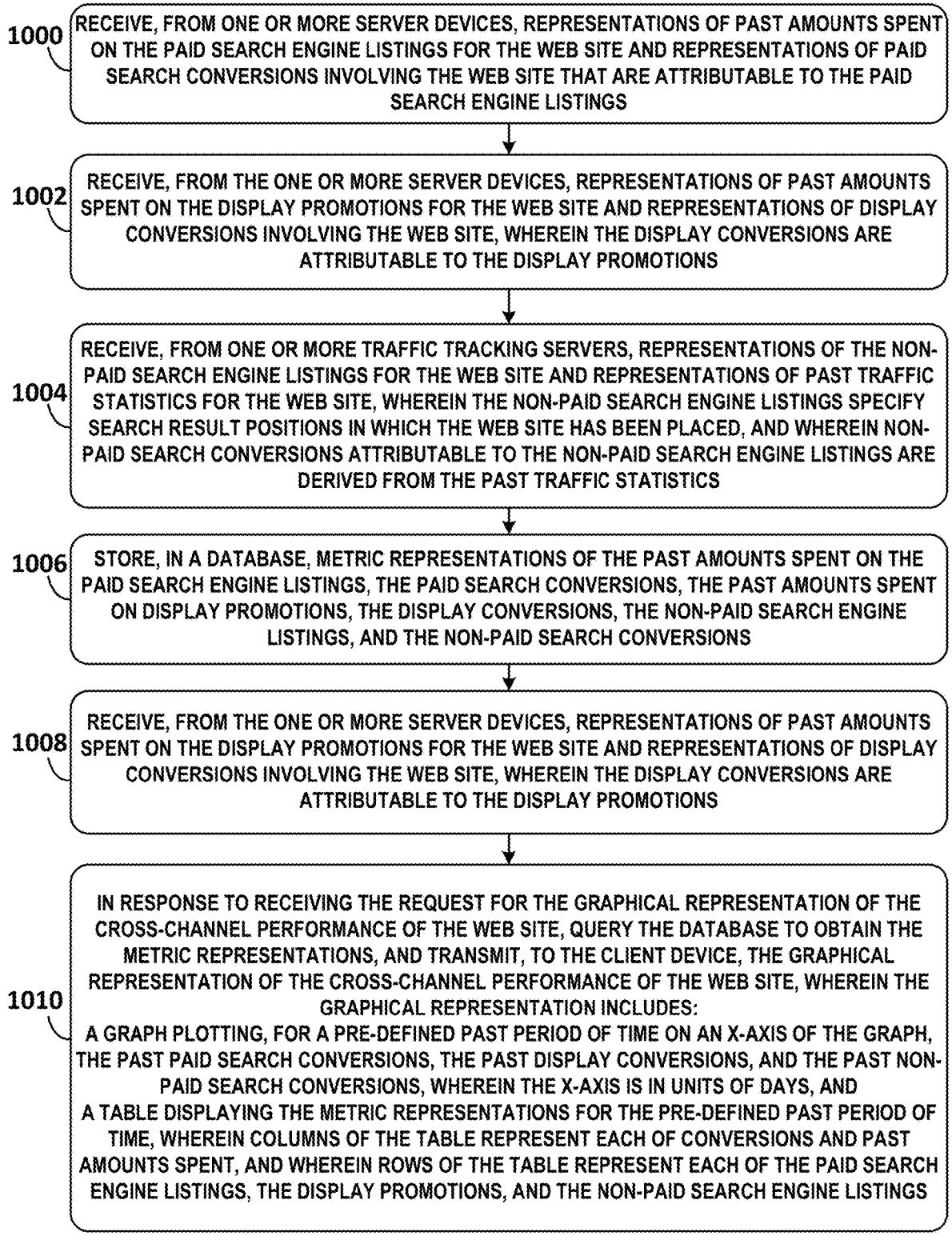
FIG. 10 depicts a flowchart, according to an example embodiment.

FIGS. 9 and 10 are flowcharts illustrating example embodiments. The processes illustrated by FIGS. 9 and 10 may be carried out by a computing device, such as computing device 200, and/or a cluster of computing devices, such as server cluster 304. However, the processes can be carried out by other types of devices or device subsystems. For example, the processes could be carried out by a portable computer, such as a laptop or a tablet device.

Turning to FIG. 9, block 900 may involve repeatedly receiving, from one or more online advertising service devices at which one or more online advertising campaigns are operated, updates to information related to two or more channels associated with the one or more online advertising campaigns. Each of the two or more channels may relate to online advertising metrics or measured website traffic. The information may include a plurality of metrics.

Block 902 may involve receiving, via selectable controls on a graphical user interface of a client device, a selection of one of the plurality of metrics.

Block 904 may involve transmitting, for display on the graphical user interface, data representing values of the selected metric over a pre-defined period of time. Reception of the data may cause the client device to plot a graph indicating the values of the selected metric over the pre-defined period of time.

Some embodiments may further involve: (i) receiving, via the selectable controls on the graphical user interface, a selection of two view options, one defining a type of view, the other defining types of data to be viewed, (ii) possibly based on the selected two view options, determining a subset of the information related to the two or more channels, and (iii) transmitting, by the computing device for display on the graphical user interface, data representing values of the subset of the information over the pre-defined period of time. Reception of the data may cause the client device to display a table indicating the values of the subset of the information over the pre-defined period of time. The columns and rows of the table may be defined by the type of view and the types of data to be viewed.

In some embodiments, the graphical user interface includes a column selection control configured to change the columns of the table as displayed to user-defined selections. Alternatively or additionally, the graphical user interface may include a report selection control that is configured to define a performance report. The defined performance report may be specified by an operation applied to a particular metric of the plurality of metrics. The report selection control, when applied, may cause the table to be filtered based on the defined performance report.

In some embodiments, the types of data define metrics columns that appear in the table. Each metrics column may display values associated with one of the plurality of metrics. In one example, the type of view is a channel view that defines columns for channels. The defined columns may appear in the table. Entries in the advertising campaigns column may be at least one of the two or more channels.

In another example, the type of view may be a trend of week view that defines columns for weeks and channels. The defined columns may appear in the table. Entries in the weeks column may be strings defined by an advertiser or an online advertising agency. Entries in the channels column may be at least one of the two or more channels.

In another example, the type of view may be a trend of month view that defines columns for months and channels. The defined columns may appear in the table. Entries in the months column may be strings defined by an advertiser or an online advertising agency. Entries in the channels column may be at least one of the two or more channels.

In some embodiments, the selected two view options are received via selectable view menu controls on the graphical user interface. Alternatively, the selected two view options may be automatically selected, by a computing device, based on the selected metric.

In some embodiments, at least one of the two or more channels may be display advertising. Alternatively, at least one of the two or more channels may be paid search or SEO.

In some embodiments, the graph may represent the pre-defined period of time on an x-axis and represent the values of the selected metric on a y-axis.

In some embodiments, the selected metric relates to different measurements of: performance of online advertising, cost of the online advertising, revenue of the online advertising, and conversions of the online advertising.

In some embodiments, the updates to the information are repeatedly received from two or more online advertising service devices that are operated by different online advertising service providers. Values of the selected metric may include aggregations of the information received from all of the two or more online advertising service devices.

FIG. 10 depicts a flowchart of a method for visualizing cross-channel web site performance including channels for paid search engine listings, display promotions, and non-paid search engine listings for a web site.

Block 1000 may involve receiving, from one or more server devices, representations of past amounts spent on the paid search engine listings for the web site and representations of paid search conversions involving the web site that may be attributable to the paid search engine listings.

Block 1002 may involve receiving, from the one or more server devices, representations of past amounts spent on the display promotions for the web site and representations of display conversions involving the web site. The display conversions may be attributable to the display promotions.

Block 1004 may involve receiving, from one or more traffic tracking servers, representations of the non-paid search engine listings for the web site and representations of past traffic statistics for the web site. The non-paid search engine listings may specify search result positions in which the web site has been placed. Non-paid search conversions attributable to the non-paid search engine listings may be derived from the past traffic statistics.

Block 1006 may involve storing, in a database, metric representations of the past amounts spent on the paid search engine listings, the paid search conversions, the past amounts spent on display promotions, the display conversions, the non-paid search engine listings, and the non-paid search conversions.

Block 1008 may involve receiving, from a client device, a request for a graphical representation of the cross-channel performance of the web site with respect to conversions.

Block 1010 may involve in response to receiving the request for the graphical representation of the cross-channel performance of the web site, querying the database to obtain the metric representations, and transmitting, to the client device, the graphical representation of the cross-channel performance of the web site. The graphical representation may include a graph plotting, for a pre-defined past period of time on an x-axis of the graph, the past paid search conversions, the past display conversions, and the past non-paid search conversions. The x-axis may be in units of days. The graphical representation may also include a table displaying the metric representations for the pre-defined past period of time. Columns of the table may represent each of conversions and past amounts spent. Rows of the table may represent each of the paid search engine listings, the display promotions, and the non-paid search engine listings.

In some embodiments, the graphical representation may also include a drop-down metric selector that is operable to replace the paid search conversions, the display conversions, and the non-paid conversions plotted on the graph with plots of a metric other than conversions.

In some embodiments, impressions involve a hyperlink to the web site being transmitted to a device. These embodiments may further involve receiving, by way of the communication unit and from the client device, input that indicates that an impressions metric has been selected by way of the drop-down metric selector. These embodiments may further involve in response receiving the input, modifying the graph to display paid search impressions attributable to the spending on the paid search engine listings, display impressions attributable to the spending on display promotions, and non-paid impressions attributable to the non-paid search engine listings. The non-paid impressions may be derived from the representations of past traffic statistics.

In some embodiments, clicks involve a hyperlink to the web site being requested by a device. The embodiments may further involve receiving, from the client device, input that indicates that a clicks metric has been selected by way of the drop-down metric selector. These embodiments may further involve, in response receiving the input, modifying the graph to display paid search clicks attributable to the spending on paid search engine listings, display clicks attributable to the spending on display promotions, and non-paid clicks attributable to the non-paid search engine listings. The non-paid clicks may be derived from the representations of past traffic statistics.

In some embodiments, the graphical representation may also include a tabbed time unit selector that controls granularity of the pre-defined past period of time on x-axis. The tabbed time period selector may include tabs for days, weeks, and months. Selection of the tab for days may cause the graph to be plotted such that the x-axis is in units of days.

Selection of the tab for weeks may cause the graph to be plotted such that the x-axis is in units of weeks. Selection of the tab for months may cause the graph to be plotted such that the x-axis is in units of months.

In some embodiments, the graphical representation may also include a drop-down time period selector that controls a range the pre-defined past period of time displayed on the x-axis and the metric representations displayed in the table.

In some embodiments, impressions may involve a hyperlink to the web site being transmitted to a device. Clicks may involve a hyperlink to the web site being requested by the device. Columns of the table may also represent each of impressions and clicks.

In some embodiments, one or more columns of the table may represent revenue derived from the paid search conversions, the display conversions, and the non-paid search conversions.

In some embodiments, the graphical representation may include a column selection option. These embodiments may further involve receiving, from the client device, input that indicates that a user-defined set of columns has been selected by way of the column selection option. Each of the columns in the user-defined set of columns may be associated with one of the metric representations. These embodiments may further involve, in response receiving the input, modifying the table to display only the user-defined set of columns.

In some embodiments, reception of the graphical representation may cause the client device to display the graph and the table on a graphical display unit of the client device.

In some embodiments, each of the paid search engine listings for the web site may indicate that content related to the web site has been displayed in search engine output due to an associated payment made on behalf of the web site.

In some embodiments, each of the paid search conversions involving the web site may be a conversion directly resulting from the content having been displayed in search engine output.

In some embodiments, each of the non-paid search engine listings for the web site may indicate that content related to the web site has been displayed in search engine output without an associated payment made on behalf of the web site.

In some embodiments, each of the non-paid search conversions involving the web site may be a conversion directly resulting from the content having been displayed in search engine output.

In some embodiments, each of the display promotions for the web site indicates that content related to the web site may have been displayed on a third-party web site. In some embodiments, each of the display conversions involving the web site may be a conversion directly resulting from the content having been displayed on a third-party web site.

In some embodiments, the one or more server devices may provide interfaces for defining paid search engine listings and display promotions.

In some embodiments, the graphical representation may include a selectable option for the table to display sets of rows, each set related to the paid search engine listings, the display promotions, and the non-paid search engine listings for a respective week.

The embodiments of FIGS. 9 and 10 may be simplified by the removal of any one or more of the features shown therein. Further, these embodiments may be combined with one another as well as features, aspects, and/or implementations of any of the previous figures or otherwise described herein.

10. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrently or in reverse order, depending on the functionality involved. Further, more or fewer blocks and/or functions can be used with any of the ladder diagrams, scenarios, and flowcharts discussed herein, and these ladder diagrams, scenarios, and flowcharts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system for visualizing cross-channel web site performance including channels for paid search engine listings, display promotions, and non-paid search engine listings for a web site, the computing system comprising:
   a database;
   a processor;
   a communication unit; and
   a memory, wherein the memory contains program instructions that, when executed by the processor, cause the computing system to:
      receive, by way of the communication unit and from one or more server devices, representations of past amounts spent on the paid search engine listings for the web site and representations of paid search conversions involving the web site that are attributable to the paid search engine listings;
      receive, by way of the communication unit and from the one or more server devices, representations of past amounts spent on the display promotions for the web site and representations of display conversions involving the web site, wherein the display conversions are attributable to the display promotions;
      receive, by way of the communication unit and from one or more traffic tracking servers, representations of the non-paid search engine listings for the web site and representations of past traffic statistics for the web site, wherein the non-paid search engine listings specify search result positions in which the web site has been placed, and wherein non-paid search conversions attributable to the non-paid search engine listings are derived from the past traffic statistics;
      store, in the database, metric representations of the past amounts spent on the paid search engine listings, the paid search conversions, the past amounts spent on display promotions, the display conversions, the non-paid search engine listings, and the non-paid search conversions;
      receive, by way of the communication unit and from a client device, a request for a graphical representation of the cross-channel performance of the web site with respect to conversions; and
      in response to receiving the request for the graphical representation of the cross-channel performance of the web site, query the database to obtain the metric representations, and transmit, by way of the communication unit and to the client device, the graphical representation of the cross-channel performance of the web site, wherein the graphical representation includes:
         a graph plotting, for a pre-defined past period of time on an x-axis of the graph, the past paid search conversions, the past display conversions, and the past non-paid search conversions, wherein the x-axis is in units of days, and
         a table displaying the metric representations for the pre-defined past period of time, wherein columns of the table represent each of conversions and past amounts spent, wherein the conversions include the past paid search conversions, the past display conversions, and the past non-paid search, and wherein rows of the table represent each of the paid search engine listings, the display promotions, and the non-paid search engine listings.

2. The computing system of claim 1, wherein the graphical representation also includes a drop-down metric selector that is operable to replace the paid search conversions, the display conversions, and the non-paid conversions plotted on the graph with plots of a metric other than conversions.

3. The computing system of claim 2, wherein impressions involve a hyperlink to the web site being transmitted to a device, and wherein the program instructions, when executed by the processor, further cause the computing system to:
   receive, by way of the communication unit and from the client device, input that indicates that an impressions metric has been selected by way of the drop-down metric selector; and
   in response receiving the input, modifying the graph to display paid search impressions attributable to the spending on the paid search engine listings, display impressions attributable to the spending on display promotions, and non-paid impressions attributable to the non-paid search engine listings, and wherein the non-paid impressions are derived from the representations of past traffic statistics.

4. The computing system of claim 2, wherein clicks involve a hyperlink to the web site being requested by a device, and wherein the program instructions, when executed by the processor, further cause the computing system to:
   receive, by way of the communication unit and from the client device, input that indicates that a clicks metric has been selected by way of the drop-down metric selector; and
   in response receiving the input, modifying the graph to display paid search clicks attributable to the spending on paid search engine listings, display clicks attributable to the spending on display promotions, and non-paid clicks attributable to the non-paid search engine listings, wherein the non-paid clicks are derived from the representations of past traffic statistics.

5. The computing system of claim 1, wherein the graphical representation also includes a tabbed time unit selector that controls granularity of the pre-defined past period of time on x-axis, wherein the tabbed time period selector includes tabs for days, weeks, and months, wherein selection of the tab for days causes the graph to be plotted such that the x-axis is in units of days, wherein selection of the tab for weeks causes the graph to be plotted such that the x-axis is in units of weeks, and wherein selection of the tab for months causes the graph to be plotted such that the x-axis is in units of months.

6. The computing system of claim 1, wherein the graphical representation also includes a drop-down time period selector that controls a range the pre-defined past period of time displayed on the x-axis and the metric representations displayed in the table.

7. The computing system of claim 1, wherein impressions involve a hyperlink to the web site being transmitted to a device, wherein clicks involve a hyperlink to the web site being requested by the device, wherein columns of the table also represent each of impressions and clicks.

8. The computing system of claim 1, wherein one or more columns of the table represent revenue derived from the paid search conversions, the display conversions, and the non-paid search conversions.

9. The computing system of claim 1, wherein the graphical representation includes a column selection option, and wherein the program instructions, when executed by the processor, further cause the computing system to:
  receive, by way of the communication unit and from the client device, input that indicates that a user-defined set of columns has been selected by way of the column selection option, wherein each of the columns in the user-defined set of columns is associated with one of the metric representations; and
  in response receiving the input, modifying the table to display only the user-defined set of columns.

10. The computing system of claim 1, wherein reception of the graphical representation causes the client device to display the graph and the table on a graphical display unit of the client device.

11. The computing system of claim 1, wherein each of the paid search engine listings for the web site indicates that content related to the web site has been displayed in search engine output due to an associated payment made on behalf of the web site.

12. The computing system of claim 11, wherein each of the paid search conversions involving the web site is a conversion directly resulting from the content having been displayed in search engine output.

13. The computing system of claim 1, wherein each of the non-paid search engine listings for the web site indicates that content related to the web site has been displayed in search engine output without an associated payment made on behalf of the web site.

14. The computing system of claim 13, wherein each of the non-paid search conversions involving the web site is a conversion directly resulting from the content having been displayed in search engine output.

15. The computing system of claim 1, wherein each of the display promotions for the web site indicates that content related to the web site has been displayed on a third-party web site.

16. The computing system of claim 15, wherein each of the display conversions involving the web site is a conversion directly resulting from the content having been displayed on a third-party web site.

17. The computing system of claim 1, wherein the one or more server devices provides interfaces for defining paid search engine listings and display promotions.

18. The computing system of claim 1, wherein the graphical representation includes a selectable option for the table to display sets of rows, each set related to the paid search engine listings, the display promotions, and the non-paid search engine listings for a respective week.

19. A method for visualizing cross-channel web site performance including channels for paid search engine listings, display promotions, and non-paid search engine listings for a web site, the method comprising:
  receiving, by a computing system and from one or more server devices, representations of past amounts spent on the paid search engine listings for the web site and representations of paid search conversions involving the web site that are attributable to the paid search engine listings;
  receiving, by the computing system and from the one or more server devices, representations of past amounts spent on the display promotions for the web site and representations of display conversions involving the web site, wherein the display conversions are attributable to the display promotions;
  receiving, by the computing system and from one or more traffic tracking servers, representations of the non-paid search engine listings for the web site and representations of past traffic statistics for the web site, wherein the non-paid search engine listings specify search result positions in which the web site has been placed, and wherein non-paid search conversions attributable to the non-paid search engine listings are derived from the past traffic statistics;
  storing, in a database, metric representations of the past amounts spent on the paid search engine listings, the paid search conversions, the past amounts spent on display promotions, the display conversions, the non-paid search engine listings, and the non-paid search conversions;
  receiving, by the computing system and from a client device, a request for a graphical representation of the cross-channel performance of the web site with respect to conversions; and
  in response to receiving the request for the graphical representation of the cross-channel performance of the web site, the computing system querying the database to obtain the metric representations, and transmitting, to the client device, the graphical representation of the cross-channel performance of the web site, wherein the graphical representation includes:
  a graph plotting, for a pre-defined past period of time on an x-axis of the graph, the past paid search conversions, the past display conversions, and the past non-paid search conversions, wherein the x-axis is in units of days, and
  a table displaying the metric representations for the pre-defined past period of time, wherein columns of the table represent each of conversions and past amounts spent, wherein the conversions include the past paid search conversions, the past display conversions, and the past non-paid search, and wherein rows of the table represent each of the paid search engine listings, the display promotions, and the non-paid search engine listings.

20. An article of manufacture including a non-transitory computer-readable medium, having stored thereon program instructions that, upon execution by a computing device, cause the computing device to perform operations comprising:
  receiving, from one or more server devices, representations of past amounts spent on paid search engine listings for the web site and representations of paid search conversions involving the web site that are attributable to the paid search engine listings;

receiving, from the one or more server devices, representations of past amounts spent on display promotions for the web site and representations of display conversions involving the web site, wherein the display conversions are attributable to the display promotions;

receiving, from one or more traffic tracking servers, representations of non-paid search engine listings for the web site and representations of past traffic statistics for the web site, wherein the non-paid search engine listings specify search result positions in which the web site has been placed, and wherein non-paid search conversions attributable to the non-paid search engine listings are derived from the past traffic statistics;

storing, in a database, metric representations of the past amounts spent on the paid search engine listings, the paid search conversions, the past amounts spent on display promotions, the display conversions, the non-paid search engine listings, and the non-paid search conversions;

receiving, from a client device, a request for a graphical representation of cross-channel performance of the web site with respect to conversions; and in response to receiving the request for the graphical representation of the cross-channel performance of the web site, querying the database to obtain the metric representations, and transmitting, to the client device, the graphical representation of the cross-channel performance of the web site, wherein the graphical representation includes:

a graph plotting, for a pre-defined past period of time on an x-axis of the graph, the past paid search conversions, the past display conversions, and the past non-paid search conversions, wherein the x-axis is in units of days, and a table displaying the metric representations for the pre-defined past period of time, wherein columns of the table represent each of conversions and past amounts spent, wherein the conversions include the past paid search conversions, the past display conversions, and the past non-paid search, and wherein rows of the table represent each of the paid search engine listings, the display promotions, and the non-paid search engine listings.

\* \* \* \* \*